(12) United States Patent
Kobayashi et al.

(10) Patent No.: US 8,228,970 B2
(45) Date of Patent: Jul. 24, 2012

(54) SIGNAL PROCESSING DEVICE AND WIRELESS APPARATUS

(75) Inventors: Kaoru Kobayashi, Chitose (JP); Shigeru Takegishi, Chitose (JP); Nobuo Tsukamoto, Akishima (JP)

(73) Assignee: Nihon Dempa Kogyo Co., Ltd, Tokyo (JP)

( * ) Notice: Subject to any disclaimer, the term of this patent is extended or adjusted under 35 U.S.C. 154(b) by 916 days.

(21) Appl. No.: 12/213,881

(22) Filed: Jun. 25, 2008

(65) Prior Publication Data

US 2009/0034587 A1 Feb. 5, 2009

(30) Foreign Application Priority Data

Jun. 26, 2007 (JP) ................ P.2007-167576

(51) Int. Cl.
*H04B 1/00* (2006.01)
(52) U.S. Cl. ...................... 375/146; 375/362
(58) Field of Classification Search .................. 375/130, 375/143, 295, 296
See application file for complete search history.

(56) References Cited

U.S. PATENT DOCUMENTS

| | | | | | |
|---|---|---|---|---|---|
| 4,481,640 | A | * | 11/1984 | Chow et al. | 375/143 |
| 5,293,406 | A | * | 3/1994 | Suzuki | 375/295 |
| 5,428,647 | A | * | 6/1995 | Rasky et al. | 375/366 |
| 6,629,121 | B1 | * | 9/2003 | Ishikawa et al. | 708/815 |
| 2002/0154688 | A1 | * | 10/2002 | Pollmann et al. | 375/229 |
| 2003/0053550 | A1 | * | 3/2003 | Peyla et al. | 375/267 |
| 2004/0228421 | A1 | * | 11/2004 | Simon | 375/296 |
| 2005/0141594 | A1 | * | 6/2005 | Smith et al. | 375/130 |
| 2006/0233226 | A1 | * | 10/2006 | Zhang | 375/149 |
| 2007/0004351 | A1 | * | 1/2007 | Dekker | 455/127.1 |
| 2008/0161660 | A1 | * | 7/2008 | Arneson et al. | 600/302 |
| 2010/0102895 | A1 | * | 4/2010 | Beukema et al. | 332/103 |

FOREIGN PATENT DOCUMENTS

| | | |
|---|---|---|
| JP | 07-046281 | 2/1995 |
| JP | 08-265296 | 10/1996 |
| JP | 05-347644 | 12/1996 |
| JP | 10-303996 | 11/1998 |
| JP | 2001-148683 | 5/2001 |
| JP | 2001-514392 | 9/2001 |
| JP | 2002-014159 | 1/2002 |
| WO | WO 99/10756 | 3/1999 |

* cited by examiner

Primary Examiner — Jaison Joseph
(74) Attorney, Agent, or Firm — Jacobson Holman PLLC

(57) ABSTRACT

There is provided a signal processing device and a wireless apparatus capable of not erroneously determining polarity, appropriately performing a spread modulation process, a carrier modulation process, and reception data demodulation process, improving reception accuracy, and miniaturizing a circuit, even when IF carrier frequency shift occurs. The signal processing device and the wireless apparatus includes a spread modulation unit which includes a first differential encoding process section for performing a differential encoding process on a reception data, a differential encoding process section for performing a second differential encoding process on the output, and a spread modulation process section for performing a spread modulation process on the output using a spread code; a carrier modulation unit which quadrature-modulates a transmission data spread modulation signal and a continuous wave; and a reception data decoding unit which performs a correlation process twice and a delay detection process twice.

4 Claims, 19 Drawing Sheets

BLOCK DIAGRAM OF SYSTEM CONFIGURATION

SIGNAL PROCESSING DEVICE AND WIRELESS APPARATUS

BACKGROUND OF THE INVENTION

1. Field of the Invention

The present invention relates to a wireless apparatus used in a duplex wireless system, and particularly to a signal processing device and a wireless apparatus capable of appropriately performing a spread modulation process, a carrier modulation process, and a reception data decoding process, improving reception accuracy, and miniaturizing a circuit, even when IF carrier frequency shift occurs.

2. Description of the Related Art

[Duplex Wireless System: FIG. 18]

A wireless apparatus used in a known duplex wireless system is a wireless apparatus which uses a spread spectrum (SS) method to operate with weak radio waves.

The known duplex wireless system will be described with reference to FIG. 18. FIG. 18 is a schematic diagram illustrating the known duplex wireless system.

The known duplex wireless system includes a wireless apparatus (base station) 1 including a transmitting unit 1a and a receiving unit 1b and a wireless apparatus (portable equipment) 2 including a transmitting unit 2a and a receiving unit 2b. The input unit of the portable equipment 2 operates, so that an operational command is transmitted from the portable equipment 2 to the base station 1 and the base station 1 operates in accordance with the command.

The base station 1 transmits a response of a delivery status of the command or status information of the base station 1 to the portable equipment 2.

That is, the known duplex wireless system is a system which can operate with weak radio waves and performs a duplex communication (half-duplex) using the SS method.

In the duplex wireless system, the portable equipment 2 leads wireless operations. The base station 1 intermittently receives a signal transmitted from the portable equipment 2 to receive a command from the portable equipment 2 and the portable equipment 2 operates only when an operation is necessary. Accordingly, consumption power can be considerably reduced.

[Configuration of Known Signal Processing Device: FIG. 19]

A signal processing device of the above-described wireless apparatus will be described with reference to FIG. 19. FIG. 19 is a block diagram illustrating the known signal processing device.

The known signal processing device includes an ADC (Analog Digital Converter) control unit 11, an AGC (Auto Gain Control) unit 12, an APC/AFC (Auto Power Control/Auto Frequency Control) control unit 13, a DAC control unit 14, a carrier demodulation unit 15, a carrier data generation unit 16, a carrier modulation unit 17, a reception data decoding unit 18', a spread code generation unit 20', a spread modulation unit 21', a correlation peak detection unit 22', a rough frequency shift detection unit 23', and a fine frequency shift detection unit 24'.

Respective units of the known signal processing device will be described in detail.

The ADC control unit 11 generates a control signal to be transmitted to an A/D converter (A/D) and controls input of a reception IF (intermediate frequency) signal from the A/D converter.

The AGC unit 12 controls a gain control signal output to an AGC amplifier in a radio frequency unit so as to constantly maintain its predetermined amplitude of the reception IF signal output from the ADC control unit 11.

The APC/AFC control unit 13 gets a temperature monitor value of the radio frequency unit from the A/D converter using a thermistor, and outputs an AFC correction value and an APC correction value to the carrier data generation unit 16 and the carrier modulation unit 17 in accordance with the monitoring value, respectively.

The DAC control unit 14 transmits data subjected to a carrier modulation process performed in the carrier modulation unit 17 to a D/A converter.

The carrier demodulation unit 15 removes an IF carrier component of the reception IF signal output from the ADC control unit 11 and again performs a down-sampling process on the data after the removal to output it to the reception data decoding unit 18', the correlation peak detection unit 22', and the rough frequency shift detection unit 23'.

The carrier data generation unit 16 performs a frequency correction process in accordance with a frequency shift value or the like from the rough frequency shift detection unit 23' and the fine frequency shift detection unit 24' to generate IF carrier data to be supplied to the carrier demodulation unit 15 and the carrier modulation unit 17.

The carrier modulation unit 17 performs an APC correction process on the IF carrier data supplied from the carrier data generation unit 16 in accordance with an APC correction request from the APC/AFC control unit 13.

The carrier modulation unit 17 also performs a carrier modulation process on spread modulation data (transmission data and synchronization word/REF data) input from the spread modulating unit 21 in accordance with the IF carrier data.

The reception data decoding unit 18' detects a synchronization word and performs a demodulation process on user data after fine frequency correction of the synchronized IF carrier frequency.

The spread code generation unit 20' generates a spread code used in the spread modulation process and a despread modulation process. Two types of the spread codes for the synchronization word/REF (reference) data and the user data are required to be used.

The spread modulating unit 21' performs a differential encoding process on the synchronization word/REF data, and performs the spread modulation process on transmission user data and the synchronization word/REF data subjected to the differential encoding process.

The correlation peak detection unit 22' performs a correlation detection process on the carrier demodulation data output from the carrier demodulation unit 15 to perform a correlation peak detection process.

The rough frequency shift detection unit 23' detects a remaining frequency component of the carrier demodulation data output from the carrier demodulation unit 15 in accordance with an amount of the IF carrier frequency shift between a base station and a portable equipment, and outputs the frequency shift to the carrier data generation unit 16.

In order to further reduce the frequency shift, the fine frequency shift detection unit 24' precisely performs a frequency detection process on correlation data of which a peak is detected, and outputs the fine frequency shift to the carrier data generation unit 16.

Examples of known techniques include JP-A-05-347644 (Patent Document 1), JP-A-10-303996 (Patent Document 2), JP-A-2001-148683 (Patent Document 3), JP-A-2002-014159 (Patent Document 4), and JP-A-2001-514392 (Patent Document 5).

Patent Document 1 discloses a data demodulator which receives a signal subjected to a PSK modulation process and demodulates data on the basis of a phase difference.

Patent Document 2 discloses a frequency shift detecting method by which a delay detection process on a signal obtained through an orthogonal detection process on a PSK signal is performed to determine frequency shift.

Patent Document 3 discloses a data transmission system which performs a demodulation process in such manner that a transmitting side transmits a signal through a spread spectrum method and a receiving side performs a matched-filter process after an IF intermediate signal process.

Patent Document 4 discloses an FM-CW radar apparatus in which a transmitting side transmits a CW signal phase-modulated in 0° and 90° and a receiving side performs a phase demodulation process.

Patent Document 5 discloses an FMCW sensor which includes a hybrid coupler with a 90° phase difference in a transmitting and receiving device.

[Patent Document 1] JP-A-05-347644
[Patent Document 2] JP-A-10-303996
[Patent Document 3] JP-A-2001-148683
[Patent Document 4] JP-A-2002-014159
[Patent Document 5] JP-A-2001-514392

In the known wireless apparatus, when IF carrier frequencies of a base station and a portable equipment are different from each other, a frequency component remains in carrier demodulation data by a difference between the IF carrier frequencies, the carrier demodulation data rotates on a complex coordinate, and thus polarity of the data can be calculated from a phase difference with the previous data in a normal delay detection process. However, when frequency shift of ±¼ bit rate or more occurs, information on the phase difference becomes abnormal, and thus there occurs a problem in that the polarity cannot be normally determined.

SUMMARY OF THE INVENTION

The invention is devised in view of the above-described circumstance, and an object of the invention is to provide a signal processing device and a wireless apparatus capable of not erroneously determining polarity, appropriately performing a spread modulation process, a carrier modulation process, and reception data demodulation process, improving reception accuracy, and miniaturizing a circuit, even when IF carrier frequency shift occurs.

In order to solve the known problems, a signal processing device includes: a spread modulation unit which includes a first differential encoding process section for performing a first differential encoding process on transmission data, a second differential encoding process section for performing a second differential encoding process on the output from the first differential encoding process section, and a spread modulation process section for performing a spread modulation process on the output from the second differential encoding process section and outputs a transmission data spread modulation signal; and a carrier modulation unit which quadrature-modulates the transmission data spread modulation signal and a continuous wave. Even when the IF carrier frequency shift occurs, the polarity is not erroneously determined, the spread modulation process and the carrier modulation process are appropriately performed, the reception accuracy is improved, and the circuit is miniaturized.

According to the signal processing device having the above-described configuration, the carrier modulation unit may include: a first amplitude correction process section which performs an amplitude correction process on transmitting IF carrier data of an in-phase component in accordance with an amplitude control correction signal; a second amplitude correction process section which performs the amplitude correction process on transmitting IF carrier data of a quadrature component in accordance with the amplitude control correction signal; a carrier modulation process section which performs a carrier modulation process in accordance with data output from the second amplitude correction process section and the transmission data spread modulation signal, and outputs a carrier modulation process signal of the transmission data spread modulation signal; and an adder which adds the output from the first amplitude correction process section to the carrier modulation process signal of the transmission data spread modulation signal as a continuous wave which has a 90° phase difference with respect to the transmission data spread modulation signal. Even when the IF carrier frequency shift occurs, the polarity is not erroneously determined, the spread modulation process and the carrier modulation process are appropriately performed, the reception accuracy is improved, and the circuit is miniaturized.

According to the signal processing device having the above-described configuration, the carrier modulation process in the carrier modulation process section may be a PSK modulation process.

The signal processing device having the above-described configuration may further include a reception data decoding unit which includes: a first division accumulation process section which performs a first correlation process on reception data of the in-phase component; a second division accumulation process section which performs the first correlation process on reception data of the quadrature component; a first delay detection process section which performs a first delay detection process on the output from the first division accumulation process section; a second delay detection process section which performs the first delay detection process on the output from the second division accumulation process section; a third division accumulation process section which performs a second correlation process on the output from the first delay detection process section; a fourth division accumulation process section which performs the second correlation process on the output from the second delay detection process section; and a third delay detection process section which performs a second delay detection process on the outputs from the third and fourth division accumulation process sections. Even when the IF carrier frequency shift occurs, the polarity is not erroneously determined, the spread modulation process, the carrier modulation process, and the reception data decoding process are appropriately performed, the reception accuracy is improved, and the circuit is miniaturized.

A wireless apparatus includes a signal processing device which includes: the spread modulation unit having the above-described configuration; the carrier modulation unit having the above-described configuration; and the reception data decoding unit having the above-described configuration. Even when the IF carrier frequency shift occurs, the spread modulation process, the carrier modulation process, and the reception data decoding process are appropriately performed, the reception accuracy is improved, and the circuit is miniaturized.

DESCRIPTION OF REFERENCE NUMERALS

Figure 1:
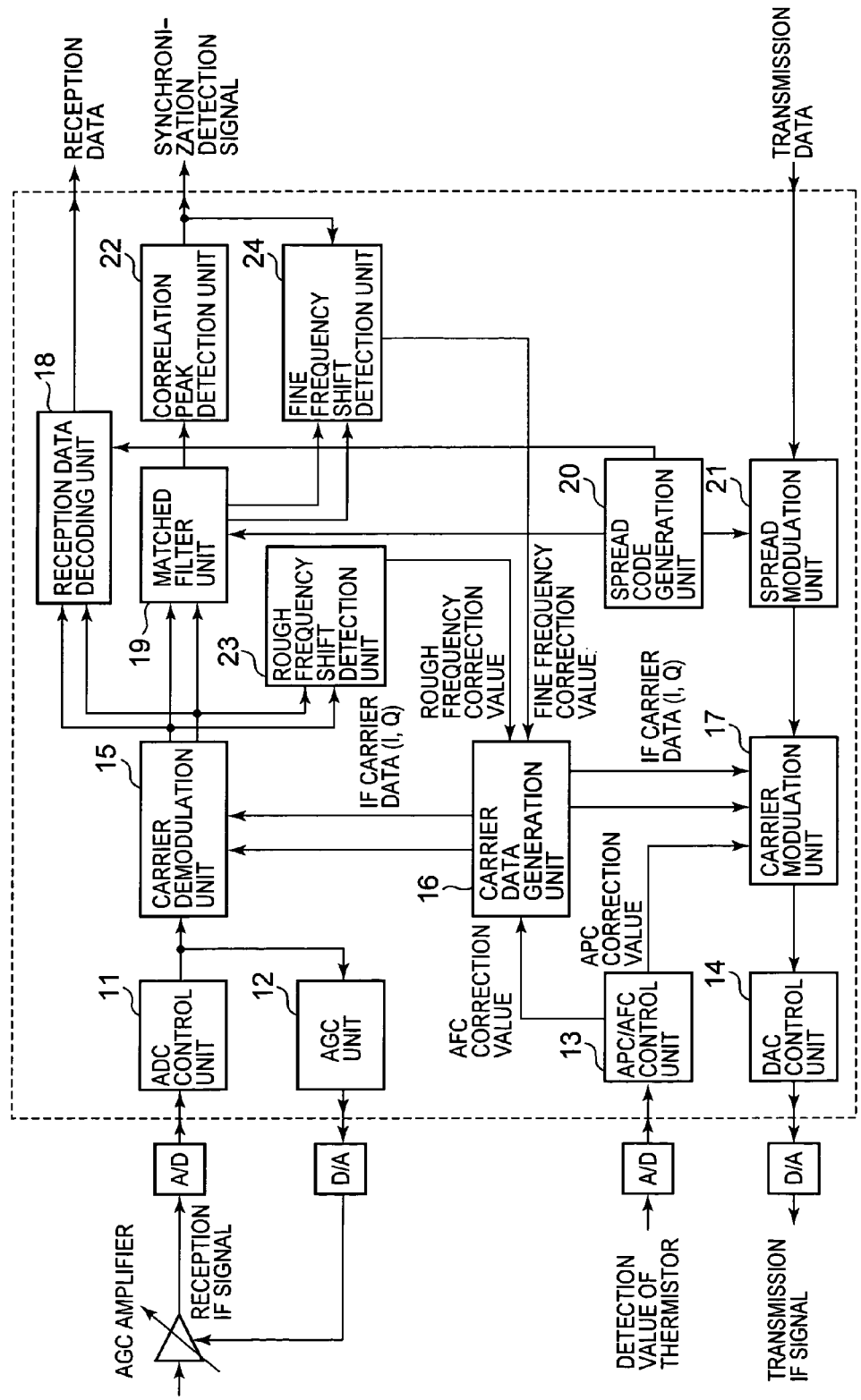
FIG. 1 is a block diagram illustrating a configuration of a signal processing device according to an embodiment of the invention.

1: WIRELESS APPARATUS (BASE STATION)
2: WIRELESS APPARATUS (PORTABLE EQUIPMENT)
11: ADC CONTROL UNIT
12: AGC UNIT
13: APC/AFC CONTROL UNIT
14: DAC CONTROL UNIT
15: CARRIER MODULATION UNIT
16: CARRIER DATA GENERATION UNIT
17: CARRIER MODULATION UNIT
18, 18': RECEPTION DATA DECODING UNIT
19: MATCHED FILTER UNIT
20, 20': SPREAD CODE GENERATION UNIT
21, 21': SPREAD MODULATION UNIT
22, 22': CORRELATION PEAK DETECTION UNIT
23, 23': ROUGH FREQUENCY SHIFT DETECTION UNIT
24, 24': FINE FREQUENCY SHIFT DETECTION UNIT
151: IF CARRIER DEMODULATION PROCESS SECTION
152: HIGH-FREQUENCY COMPONENT REMOVING SECTION
153: DOWN-SAMPLING SECTION
161: AFC ADJUSTMENT SECTION
162: INDEX COUNTER
163: ADDRESS DECODER
164: SINE WAVE TABLE
171: APC CORRECTION PROCESS SECTION
172: IF CARRIER MODULATION PROCESS SECTION
173: ADDER
174: SIGNED/UNSIGNED CONVERSION SECTION
180: DELAY CIRCUIT
181: MOVING AVERAGE SECTION
182: DECIMATION FILTER
183: HIGH-PASS FILTER
184: DESPREAD SECTION
185: DIVISION ACCUMULATION PROCESS SECTION
186: DELAY DETECTION PROCESS SECTION
187: ACCUMULATION PROCESS SECTION
188: DELAY DETECTION PROCESS SECTION
189: CODE ACQUISITION SECTION
191: RAM READING ADDRESS GENERATION SECTION
192: CARRIER DEMODULATION DATA STORAGE SECTION
193: SPREAD CODE DIVISION SECTION
194: DESPREAD PROCESS SECTION
195: ACCUMULATION PROCESS SECTION
196: PARTIAL CORRELATION CALCULATION PROCESS SECTION
197: ENTIRE ADDING PROCESS SECTION
198: SHIFT REGISTER
201: CONTROL SECTION
202: CODE GENERATION PARAMETER TABLE
203: CODE GENERATION SECTION
204: CODE STORAGE SECTION
205: SEL
211: DIFFERENTIAL CODING PROCESS SECTION
214: SPREAD MODULATION PROCESS SECTION
221: 1-BIT BLOCK MAX PEAK LOCATION DETECTION SECTION
222: MAX PEAK LOCATION COMPARISON SECTION
223: SYMBOL SYNCHRONIZATION SIGNAL GENERATION SECTION
224: FREE-RUN COUNTER
231: NOISE REMOVING SECTION
232: DOWN-SAMPLING SECTION
233: FFT CALCULATION PROCESS SECTION
234: CALCULATION RESULT ACCUMULATION PROCESS SECTION
235: MAX PEAK LOCATION DETECTION SECTION
241: FFT CALCULATION PROCESS SECTION
242: MAX PEAK LOCATION DETECTION SECTION

DESCRIPTION OF THE PREFERRED EMBODIMENT

An exemplary embodiment of the invention will be described with reference to the drawings.

Overview of Embodiment

According to the embodiment of the invention, a signal processing device includes: a spread modulation unit which includes a first differential encoding process section for performing a first differential encoding process on transmission data, a second differential encoding process section for performing a second differential encoding process on the output from the first differential encoding process section, and a spread modulation process section for performing a spread modulation process on the output from the second differential encoding process section and outputs a transmission data spread modulation signal; and a carrier modulation unit which quadrature-modulates the transmission data spread modulation signal and a continuous wave. Even when IF carrier frequency shift occurs, polarity is not erroneously determined, the spread modulation process and the carrier modulation process are appropriately performed, reception accuracy is improved, and the circuit is miniaturized.

According to the embodiment of the invention, the signal processing device having the above-described configuration further includes a reception data decoding unit which includes: a first division accumulation process section which performs a first correlation process on reception data of the in-phase component; a second division accumulation process section which performs the first correlation process on reception data of the quadrature component; a first delay detection process section which performs a first delay detection process on the output from the first division accumulation process section; a second delay detection process section which performs the first delay detection process on the output from the second division accumulation process section; a third division accumulation process section which performs a second correlation process on the output from the first delay detection process section; a fourth division accumulation process section which performs the second correlation process on the output from the second delay detection process section; and a third delay detection process section which performs a second delay detection process on the outputs from the third and fourth division accumulation process sections. Even when IF carrier frequency shift occurs, the polarity is not erroneously determined, the spread modulation process, the carrier modulation process, and the reception data decoding process are appropriately performed, reception accuracy is improved, and the circuit is miniaturized.

According to the embodiment of the invention, a wireless apparatus includes a signal processing device which includes: the spread modulation unit; the carrier modulation unit; and the reception data decoding unit.

A transmitting side of this system multiplexes and transmits a PSK (Phase Shift Keying)-SS (Spectrum Spread) modulation signal for a user data and a quadrature modulation signal of a CW (Continuous wave) having a 90° phase difference with the PSK-SS modulation signal for detecting carrier frequency shift. Moreover, a used spread code may be of one type.

A receiving side performs an IF (Intermediate Frequency) carrier modulation process, a fine frequency shift detection and correction process on a CW component, and a synchronization process in a matched filter process. Moreover, the receiving side performs a sliding correlation process to perform the delay detection process twice after the synchronization is established.

The reason for performing the delay detection process twice is that shift of maximum ±32 Hz remains even in the fine frequency shift detection and correction process, and thus the one-time delay detection process cannot provide a countermeasure.

When the correlation process is performed in the receiving side, a 4-division correlation process is performed.

[Overall Configuration of Signal Processing Device]

According to the embodiment of the invention, the signal processing device will be described with reference to FIG. 1. FIG. 1 is a block diagram illustrating a configuration of the signal processing device according to the embodiment of the invention.

According to the embodiment of the invention, as shown in FIG. 1, the signal processing device includes an ADC (Analog Digital Converter) control unit 11, an AGC (Auto Gain Control) unit 12, an APC/AFC (Auto Power Control/Auto Frequency Control) control unit 13, a DAC control unit 14, a carrier demodulation unit 15, a carrier data generation unit 16, a carrier modulation unit 17, a reception data decoding unit 18, a matched filter unit 19, a spread code generation unit 20, a spread modulation unit 21, a correlation peak detection unit 22, a rough frequency shift detection unit 23, and a fine frequency shift detection unit 24.

[Respective Units]

Next, the units of the signal processing device will be described with reference to the drawings.

[ADC Control Unit 11]

The ADC control unit 11 reads a reception IF signal from an A/D converter IC (Integrated Circuit) and controls outputting a reception signal to the carrier demodulation unit 15.

The ADC control unit 11 generates a control signal and outputs it to the A/D converter IC.

[AGC Unit 12]

The AGC unit 12 controls outputting a control signal for performing a gain control to be transmitted to an AGC amplifier so that the reception signal output from the ADC control unit 11 constantly has its predetermined amplitude.

[APC/AFC Control Unit 13]

The APC/AFC control unit 13 generates a control signal for monitoring the temperature of a radio frequency unit (RF unit) using a thermistor, and outputs the control signal to the A/D converter IC.

The APC/AFC control unit 13 supplies an AFC correction value and an APC correction value to the carrier data generation unit 16 and the carrier modulation unit 17 in accordance with a monitoring value from the A/D converter IC, respectively.

At this time, the APC means auto transmission power control and the AFC means auto frequency control.

[DAC Control Unit 14]

The DAC control unit 14 controls transmitting data subjected to a carrier modulation process performed in the carrier modulation unit 17 to a D/A converter IC.

The DAC control unit 14 generates a control signal and outputs it to the D/A converter IC.

Figure 2:
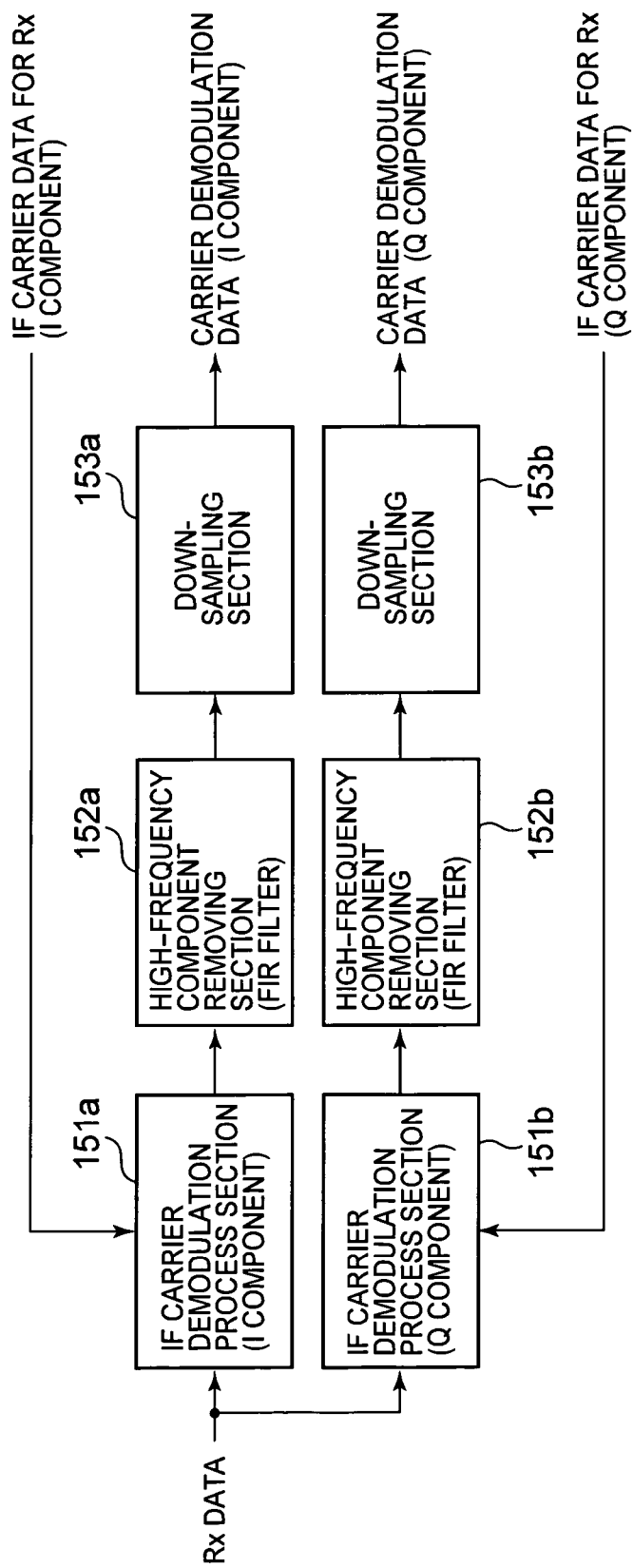
FIG. 2 is a block diagram illustrating a configuration of a carrier demodulation unit.

[Carrier Demodulation Unit 15: FIG. 2]

The carrier demodulation unit 15 will be described with reference to FIG. 2. FIG. 2 is a block diagram illustrating a configuration of the carrier demodulation unit 15.

The carrier demodulation unit 15 removes an IF carrier component of the reception IF signal on the basis of carrier data input from input from the carrier data generation unit 16, and also performs a down-sampling process from 512 kHz sampling (strictly, 524.288 Hz) to 256 kHz sampling (strictly, 262.144 Hz).

As shown in FIG. 2, the carrier demodulation unit 15 inputs the reception data (RX data), and includes an IF carrier demodulation section 151a which performs an IF carrier demodulation process on an in-phase component (I component), an IF carrier demodulation section 151b which performs the IF carrier demodulation process on a quadrature component (Q component), a high-frequency component removing section 152a which removes a high-frequency component of the I component subjected to the IF carrier demodulation process using an FIR (Finite Impulse Response) filter, a high-frequency component removing section 152b which removes a high-frequency component of the Q component subjected to the IF carrier demodulation process using the FIR filter, a down-sampling unit 153a which down-samples the I component subjected to the high-frequency removing process and outputs carrier demodulation data of the I component, and a down-sampling unit 153b which down-samples the Q component subjected to the high-frequency removing process and outputs carrier demodulation data of the Q component.

Figure 3:
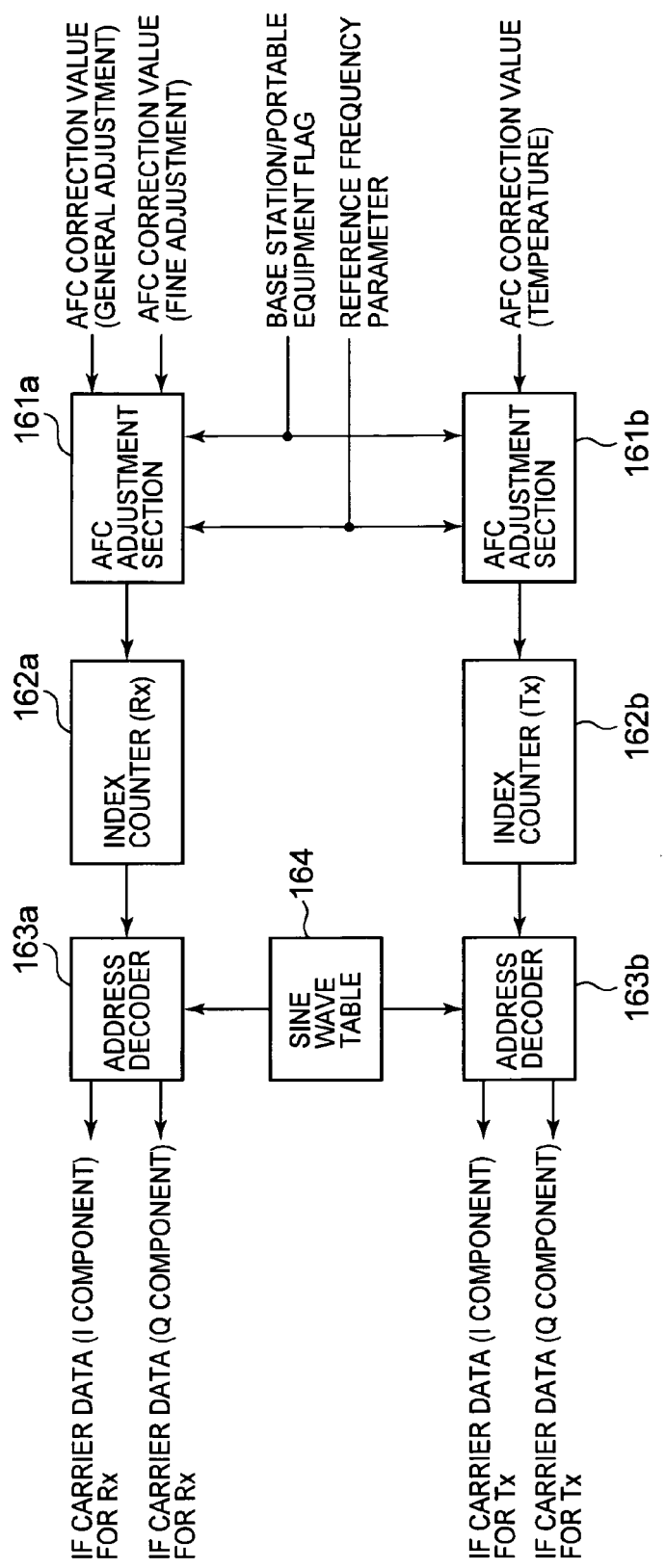
FIG. 3 is a block diagram illustrating a configuration of a carrier data generation unit.

[Carrier Data Generation Unit 16: FIG. 3]

The carrier data generation unit 16 will be described with reference to FIG. 3. FIG. 3 is a block diagram illustrating a configuration of the carrier data generation unit 16.

The carrier data generation unit 16 generates IF carrier data to be supplied to the carrier modulation unit 17 and the carrier demodulation unit 15.

Two types of the transmitting and receiving IF carrier data all having a 90° phase are generated.

The carrier data generation unit 16 performs a frequency correction process in accordance with frequency shift detection data from the rough frequency shift detection unit 23 and the fine frequency shift detection unit 24 and AFC correction data from the APC/AFC control unit 13.

Specifically, as shown in FIG. 3, the carrier data generation unit 16 includes: an AFC adjustment section 161a which performs an AFC adjustment process on an AFC correction value (general adjustment) input from the rough frequency shift detection unit 23 and an AFC correction value (fine adjustment) input from the fine frequency shift detection unit 24 on the basis of an input base station/portable equipment flag and a reference frequency parameter; an AFC adjustment section 161b which performs the AFC adjustment process on an AFC correction value (temperature) input from the APC/AFC control unit 13 on the basis of the input base station/portable equipment flag and the reference frequency parameter; an index counter (Rx) 162a which performs a receiving index count on data input from the AFC adjustment section 161a; an index counter (Tx) 162b which performs a transmitting index count on data input from the AFC adjustment section 161b; an address decoder 163a which decodes an address using a counter value of the index counter 162a on the basis of a sine wave table 164, and outputs the IF carrier data of the I component for Rx and the IF carrier data of the Q component for Rx; and an address decoder 163b which decodes an address using a counter value of the index counter 162b on the basis of the sine wave table 164, and outputs the IF carrier data of the I component for Tx and the IF carrier data of the Q component for Tx.

Figure 12:
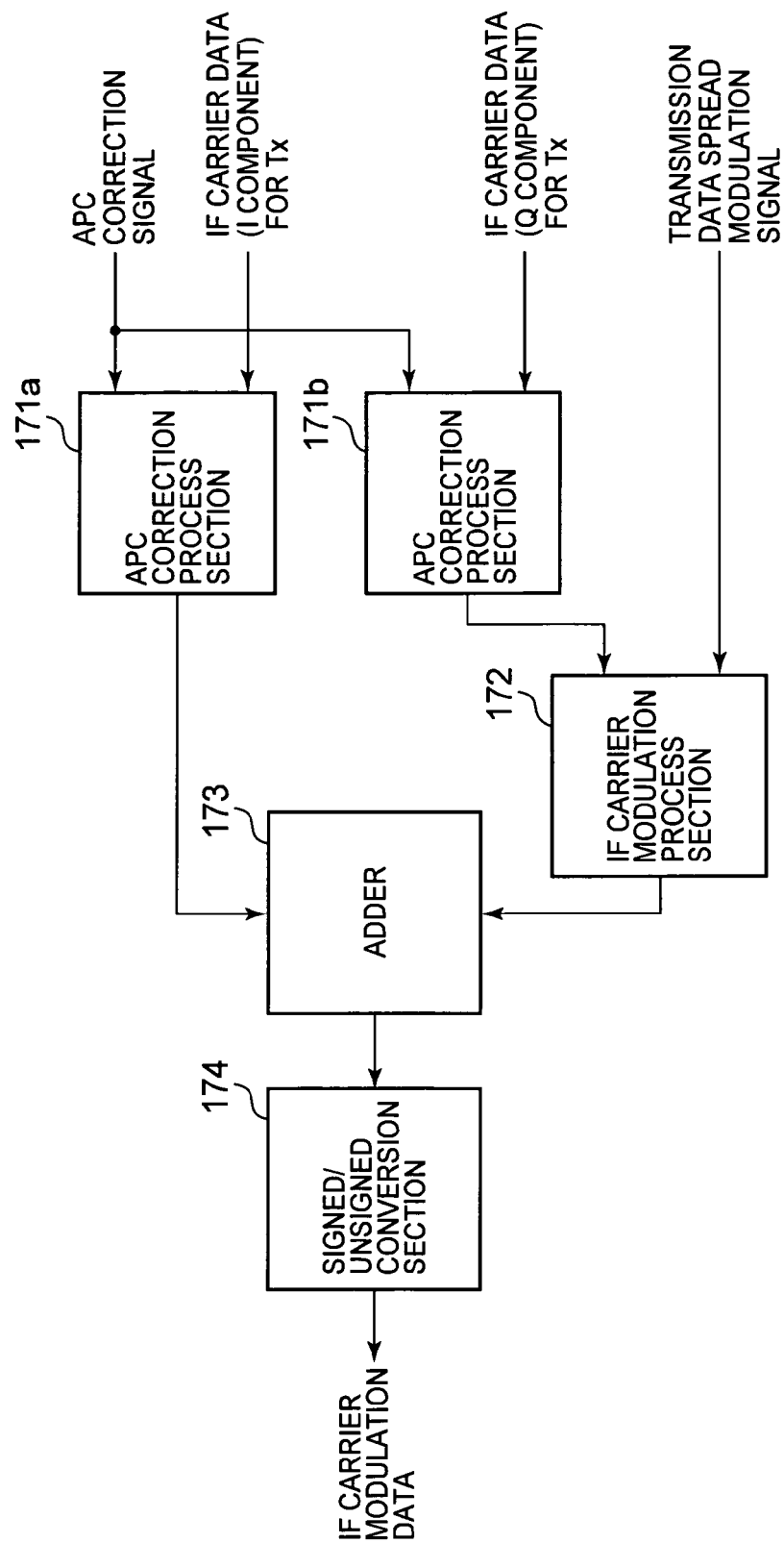
FIG. 12 is a block diagram illustrating a configuration of a carrier modulation unit.
Figure 13:
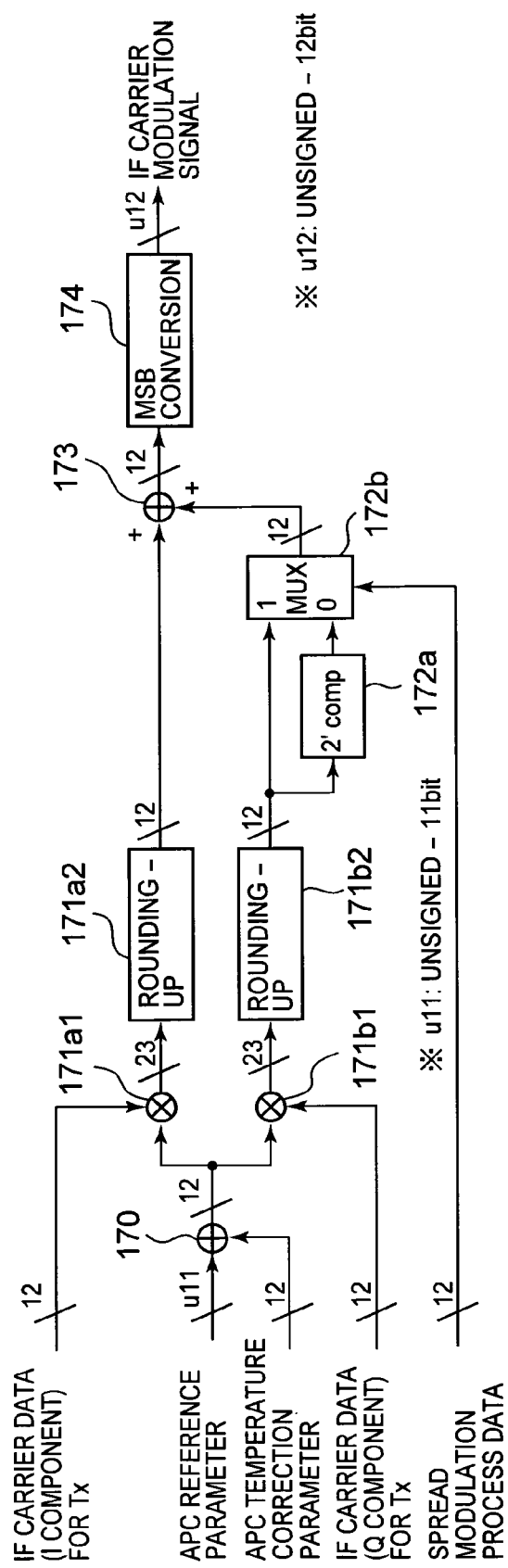
FIG. 13 is a diagram illustrating a circuit configuration of the carrier modulation unit.

[Carrier Modulation Unit 17: FIGS. 12 and 13]

Next, the carrier modulation unit 17 will be described with reference to FIGS. 12 and 13. FIG. 12 is a block diagram illustrating a configuration of the carrier modulation unit 17. FIG. 13 is a diagram illustrating a circuit configuration of the carrier modulation unit 17.

As shown in FIG. 12, the carrier modulation unit 17 includes: an APC correction process section 171a which performs an APC correction process on the IF carrier data of the I component for transmission (Tx) supplied from the carrier data generation unit 16 in accordance with an APC correction signal from the APC/AFC control unit 13; an APC correction process section 171b which performs the APC correction process on the IF carrier data of the Q component for transmission (Tx) supplied from the carrier data generation unit 16 in accordance with the APC correction signal from the APC/AFC control unit 13; an IF carrier modulation process section 172 which performs an IF carrier modulation process on the output from the APC correction process section 171b in accordance with a transmission data spread modulation signal; an adder 173 which adds the output from the APC correction process section 171a and the output from the IF carrier modulation process section 172; and a signed/unsigned conversion section 174 which convert signs of an MSB (Most Significant Bit).

The IF carrier data of the I component output from the APC correction process section 171a is a CW. The carrier modulation process of the transmission data spread modulation signal performed in the IF carrier modulation process unit 172 is a PSK modulation. As the transmission data spread modulation signal subjected to the PSK modulation, the CW having a 90° phase difference is used to transmit a quadrature modulation signal. A signal waveform subjected to an adding process by the adder 173 will be described below.

Specifically, as shown in FIG. 13, the carrier modulation 17 includes: an adder 170 which adds an APC reference parameter (Unsigned-11 bit) and an APC temperature correction parameter (Signed-12 bit); an multiplier 171a1 which multiplies the IF carrier data of the I component for Tx and the output from the adder 170; an multiplier 171b1 which multiplies the IF carrier data of the Q component for Tx and the output from the adder 170; a rounding section 171a2 which performs a rounding-up process on the output from the multiplier 171a1; a rounding section 171b2 which performs a rounding-up process on the output from the multiplier 171b1; a complement section (two's complement) 172a which acquires two's complement for the output from the rounding section 171b2; a selection section (MUX) 172b which selects and outputs one of the output from the rounding section 171b2 and the output from the complement section 172a in accordance with spread modulation process data; the adder 173 which adds the output from the rounding section 171a2 and the output from the selection section 172b; and an MSB conversion section 174 which converts the MSB of the output from the adder 173 and outputs it as an IF carrier modulation signal (Unsigned-12 bit).

Figure 4:
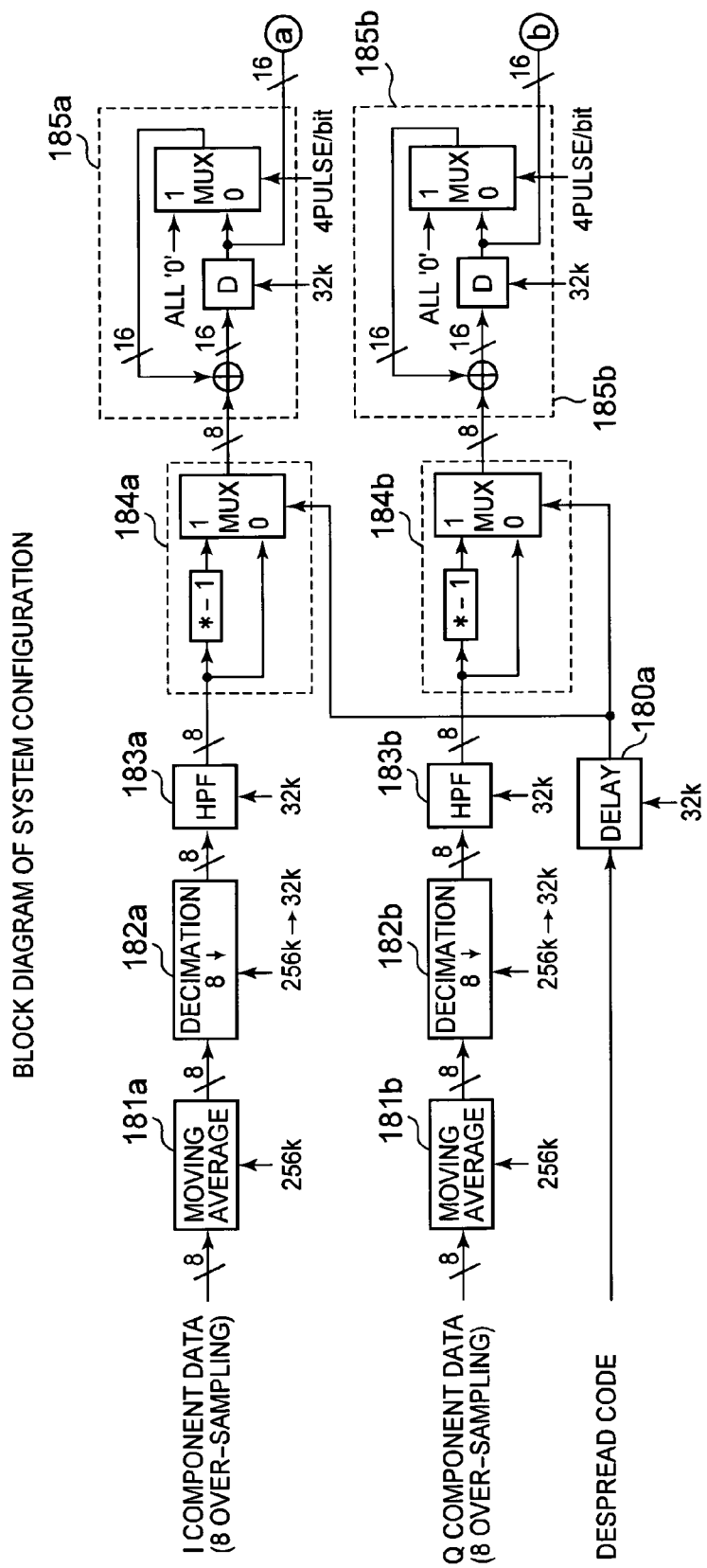
FIG. 4 is a block diagram illustrating a front-side configuration of a reception data decoding unit.
Figure 5:
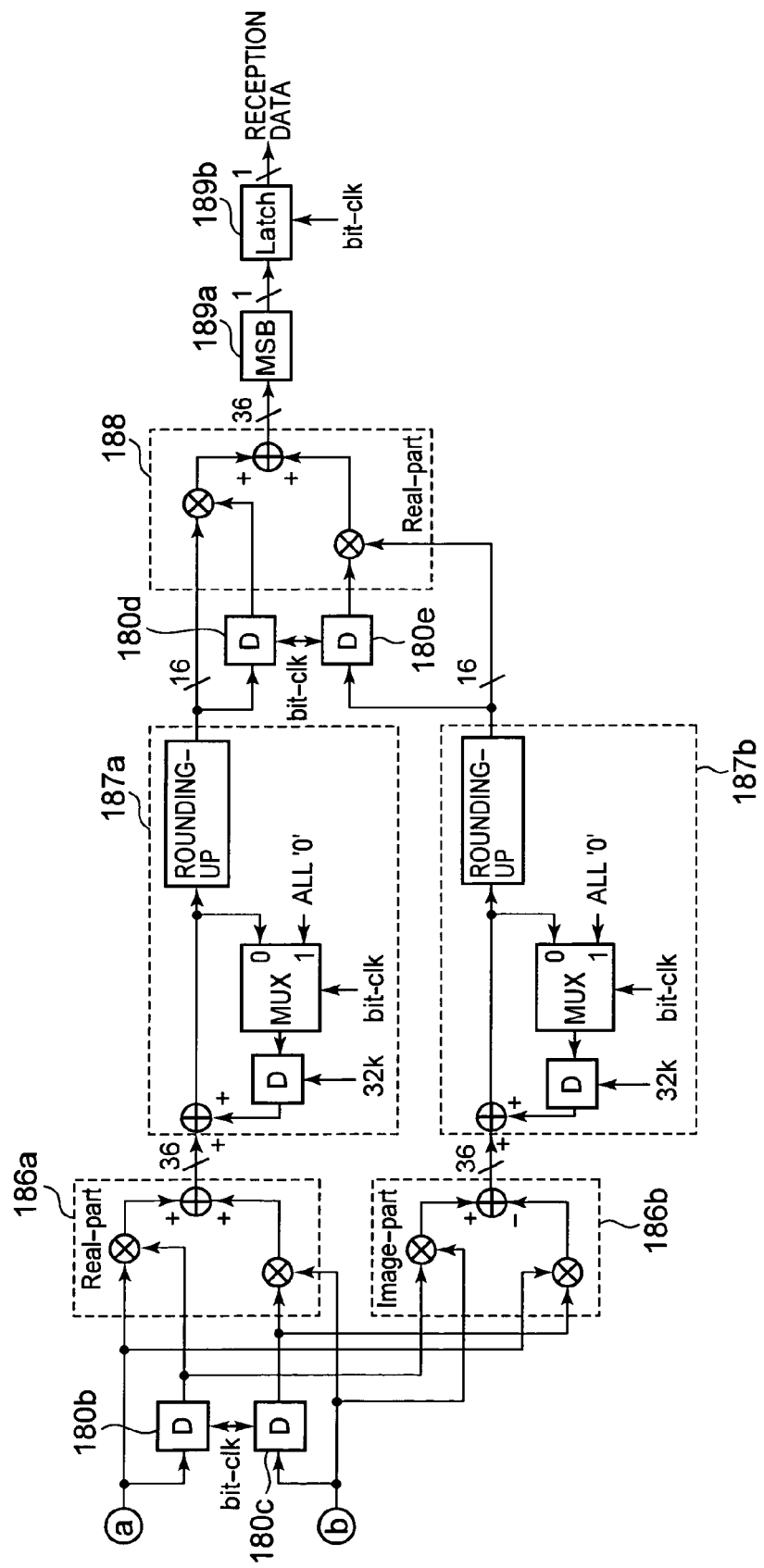
FIG. 5 is a block diagram illustrating a back-side configuration of a reception data decoding unit.

[Reception Data Decoding Unit 18: FIGS. 4 and 5]

Next, the reception data decoding unit 18 will be described with reference to FIGS. 4 and 5. FIG. 4 is a block diagram illustrating a front-side configuration of a reception data decoding unit 18. FIG. 5 is a block diagram illustrating a back-side configuration of a reception data decoding unit. (a) and (b) of FIG. 4 are connected to (a) and (b) of FIG. 5, respectively.

As shown in FIGS. 4 and 5, the reception data decoding unit 18 includes: a moving average section 181a which acquires a moving average of the I component data (8-bit) through 8-times over-sampling at 256 kHz; a decimation filter 182a which performs decimation filtering the output to perform down-sampling; a high-pass filter (HPF) 183a which removes a low-frequency component; a moving average section 181b which acquires a moving average of the Q component data (8-bit) through 8-times over-sampling at 256 kHz; a decimation filter 182b which performs decimation filtering the output to perform down-sampling; a high-pass filter (HPF) 183b which removes a low-frequency component; a delay section 180a which delays a despread code; a despread section 184a which inputs a signal from the HPF 183a to perform a despread process to the despread code from the delay section 180a; a despread section 184b which inputs a signal from the HPF 183b to perform the despread process to the despread code from the delay section 180a; a division accumulation process section 185a which performs a division accumulation process on the output from the despread section 184a; a division accumulation process section 185b which performs the division accumulation process on the output from the despread section 184b; a delay circuit (D) 180b; a delay circuit (D) 180c; a delay detection process section 186a which performs a delay detection process on a real number by adding the outputs from the division accumulation process units 185a and 185b; an accumulation process section 187a which accumulates the output; a delay detection process section 186b which performs the delay detection process on an imaginary number by adding the outputs from the division accumulation processes 185a and 185b; an accumulation process section 187b which accumulates the output; a delay circuit (D) 180d; a delay circuit (D) 180e; a delay detection process section 188; an MSB section 189a which acquires the MSB as a code acquisition section; and a latch section 189b which latches the output from the MSB section 189a and the output the reception data.

The despread sections 184a and 184b each include a complement portion (*−1) which acquires a complement of data output from the HPF 183a and the HPF 183b, respectively, and a selection portion (MUX) which inputs the data from the HPF 183a and the HPF 183b, respectively, and data from the complement portion to select several data as a despread code from the delay section 180a.

The division accumulation process sections 185a and 185b each includes an adder which adds the data from the despread sections 184a and 184b, respectively, and returned data, a delay portion which delays the output from the adder, and a selection portion (MUX) which input the data having all zero (all '0') and data from the delay circuit and outputs them as data of 4 pulse/bit to the adder. The output from the delay circuit is outputted to the delay detection process sections 186a and 186b.

The delay detection process section 186a includes a first multiplier which multiplies the output as the real number from the division accumulation process section 185a and data obtained by delaying the output by the delay circuit 180b, a second multiplier which multiplies the output from the division accumulation process section 185b and data obtained by delaying the output by the delay circuit 180c, and an adder which adds the outputs from both the multipliers.

The delay detection process section 186b includes a third multiplier which multiplies the output as the imaginary number from the division accumulation process section 185b and data obtained by delaying the output from the division accumulation process section 185a by the delay circuit 180b, a fourth multiplier which multiplies the output from the division accumulation process section 185a and data obtained by delaying the output from the division accumulation process section 185b by the delay circuit 180c, and an adder which sets the output from the third multiplier to a positive value and the output from the fourth multiplier to a negative value to adds the outputs.

The accumulation process sections 187a and 187b each include an adder which adds the output from the adders of the delay detection process sections 186a and 186b, respectively, and returned data, a selection portion (MUX) which inputs the output from each adder and data having all zero (all '0') to select and output thereof using bit-clk, a delay circuit which delays the output from the selection portion and outputs it to each adder, and a rounding portion which rounds up the output from each adder.

The delay detection process section 188 includes a multiplier which multiplies data obtained by delaying the output from the accumulation process section 187a by the delay circuit 180d and the output from the accumulation process section 187a, a multiplier which multiplies data obtained by delaying the output from the accumulation process section 187b by the delay circuit 180e and the output from the accumulation process section 187b, and an adder which adds the outputs from both the multipliers.

In the reception data decoding unit 18, the despread sections 184a and 184b and the division accumulation process sections 185a and 185b perform a correlation process (sliding correlation process), the delay detection process sections 186a and 186b perform a first delay detection process, and the accumulation process sections 187a and 187b and the delay detection process section 188 perform a second delay detection process. Accordingly, even when shift which cannot be corrected by a fine frequency shift detection and correction process is present, decoding the reception data is possible.

In a first accumulation process of the division accumulation process sections 185a and 185b, 1 bit is divided into ¼ bit to perform the accumulation process. In a second accumulation process of the accumulation process sections 187a and 187b, the accumulation process of 1 bit is performed. In addition, the delay detection process sections 186a, 186b, and 188 perform the delay detection process on the data delayed by 1 bit.

Figure 6:
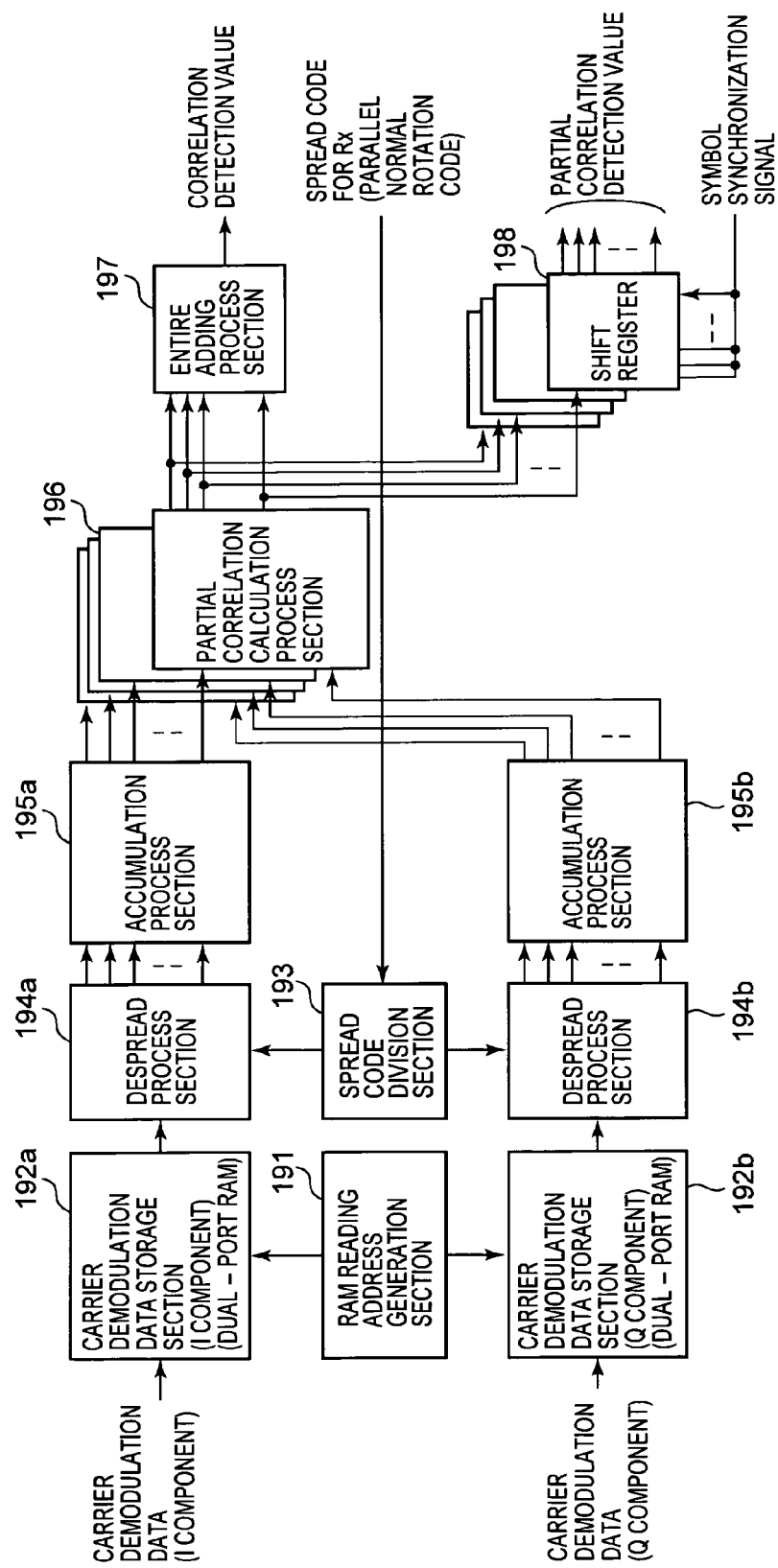
FIG. 6 is a block diagram illustrating a configuration of a matched filter unit.

[Matched Filter Unit 19: FIG. 6]

Next, the matched filter unit 19 will be described with reference to FIG. 6. FIG. 6 is a block diagram illustrating a configuration of the matched filter unit 19.

The matched filter unit 19 performs the despread process as a correlation detection process on the carrier demodulation data, and further performs an entire adding process.

Specifically, as shown in FIG. 6, the matched filter unit 19 includes: a carrier demodulation data storage section 192a of a dual-port RAM which stores the carrier demodulation data of the I component in accordance with an address output from a RAM (Random Access Memory) reading address generation section 191; a carrier demodulation data storage section 192b of a dual-port RAM which stores the carrier demodulation data of the Q component in accordance with the address output from a RAM (Random Access Memory) reading address generation section 191; a spread code division section 193 which divides and outputs the spread code; a despread process section 194a which performs the despread process on the carrier demodulation data output from the carrier demodulation data storage section 192a to obtain the divided spread code; a despread process section 194b which performs the despread process on the carrier demodulation data output from the carrier demodulation data storage section 192b to obtain the divided spread code; an accumulation process section 195a which accumulates the output from the despread process section 194a; an accumulation process section 195b which accumulates the output from the despread process section 194b; a partial correlation calculation process section 196 which performs a partial correlation calculation process on the output from the accumulation process sections 195a and 195b; an entire adding process section 197 which performs the entire adding process on the output from the partial correlation calculation process section 196; and a shift register 198 which temporarily stores the output from the partial correlation calculation process section 196 to output it as a partial correlation detection value in accordance with a symbol synchronization signal.

In the matched filter unit 19, a matched filtering process is performed by performing a pipeline process in a high-speed clock process using a dual-port RAM in the carrier demodulation data storage sections 192a and 192b in order to reduce the size of gates.

The correlation detection data (correlation detection value) subjected to the correlation detection process is supplied to the correlation peak detection unit 22.

When a peak is detected in the correlation peak detection unit 22, a detection signal (symbol synchronization signal) induces latching the correlation detection data in the shift register 198 so as to be supplied to the fine frequency shift detection unit 24.

Figure 7:
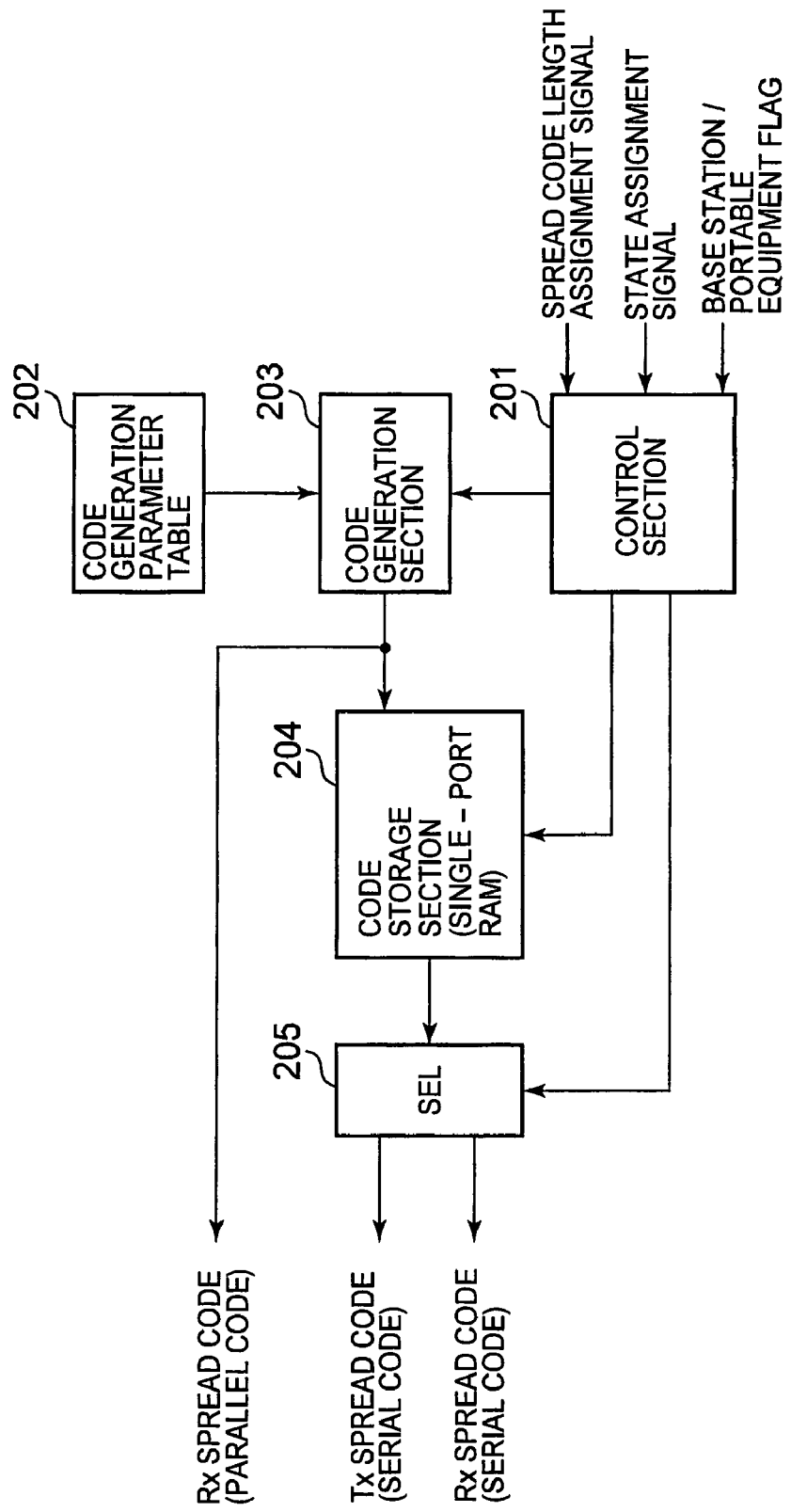
FIG. 7 is a block diagram illustrating a configuration of a spread code generation unit.

[Spread Code Generation Unit 20: FIG. 7]

The spread code generation unit 20 will be described with reference to FIG. 7. FIG. 7 is a block diagram illustrating the spread code generation unit 20.

As shown in FIG. 7, the spread code generation unit 20 inputs a spread code length assignment signal and a state assignment signal, and outputs a transmitting (Tx) spread code (serial code), a receiving (Rx) spread code (serial code), and a receiving (Rx) spread code (parallel code).

The spread code storage section in the spread code generation code generation unit 20 uses a single-port RAM, since the spread code is one system code. Accordingly, an advantage of reducing the size of a port control circuit can be obtained.

Specifically, as shown in FIG. 7, the spread code generation unit 20 includes: a control section 201 which inputs the spread code length assignment signal, the state assignment signal, the base station/portable equipment flag to output a control signal; a code generation section 203 which generates the spread code in accordance with the control signal from the control section 201 and a parameter from the code generation parameter table 202, and outputs a Rx spread code (parallel normal rotation code); a code storage section 204 of a single-port RAM which stores the spread code from the code generation section 203 in accordance with the control signal from the control section 201 and outputs the stored spread code; and a switch (SEL) 205 which selects and outputs the Tx spread code (serial code) or the Rx spread code (serial code) from the code storage section 204 in accordance with the control signal from the control section 201.

The spread code generation unit 20 generates the spread code having 512 chip length in operation of a system and stores it to the code storage section.

Figure 8:
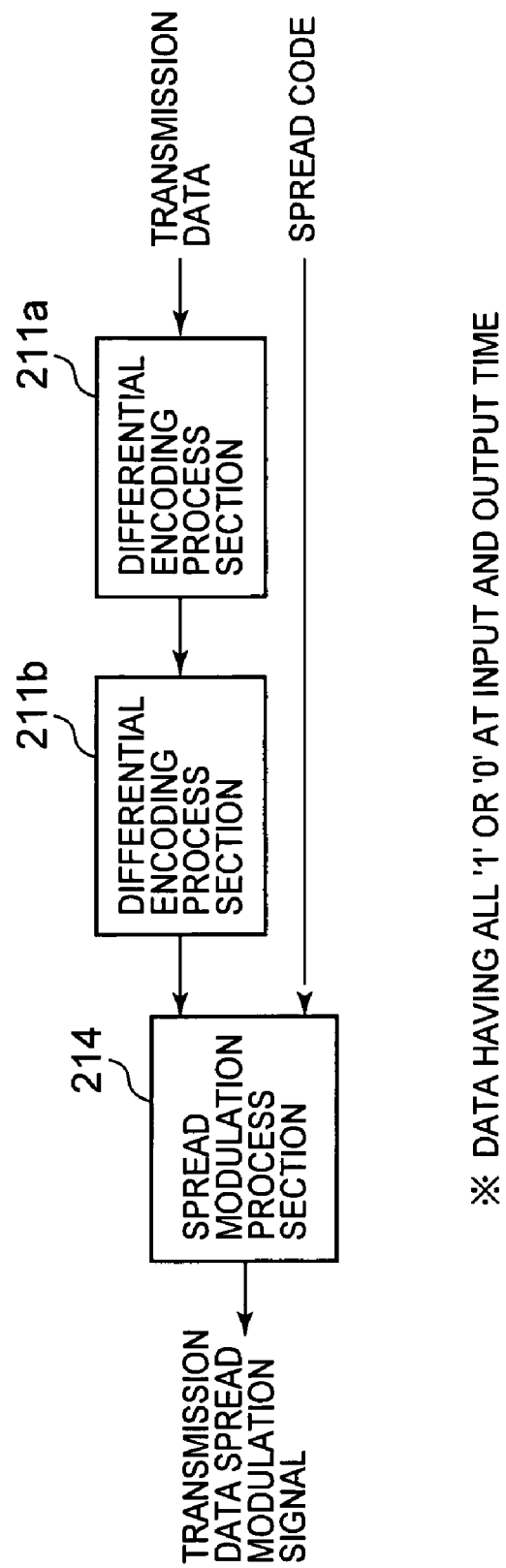
FIG. 8 is a block diagram illustrating a configuration of a spread modulation unit 21.

[Spread Modulation Unit 21: FIG. 8]

Next, the spread modulation unit 21 will be described with reference to FIG. 8. FIG. 8 is a block diagram illustrating a configuration of the spread modulation unit 21.

As shown in FIG. 8, the spread modulation unit 21 includes: a differential encoding process section 211a which inputs the transmission data to perform a first differential encoding process; a differential encoding process section 211b which performs a second differential encoding process on the output from the differential encoding process section 211a; and a spread modulation process section 214 which performs a spread modulation process on the output from the differential encoding process section 211b to output a signal data modulation signal.

The reason for performing the differential encoding process is that a delay detection process is performed to demodulate the reception data in a receiving unit.

In this embodiment, the differential encoding process is not a normal differential encoding process, but two-step differential encoding process.

The reason for multiplexing the transmission data in the form of the CW data is to detect carrier frequency shift in the rough frequency shift detection unit 23 of the receiving side.

In a known method, when the transmission data (PSK (Phase Shift Keying) modulation) is subjected to the SS modulation, the spectrum becomes disperse in the form of a transmission spectrum waveform. Accordingly, a FFT (Fast Fourier Transform) unit of the receiving side cannot detect the shift.

However, in this embodiment, the FFT unit can detect the shift when the transmission data (PSK modulation) is subjected to the SS modulation in the form of the CW data. That is because a CW component is strongly seen. An IF frequency component down-converted in a process of the receiving side is detected in the FFT unit. In the signal processing device, the peak frequency of CW is detected by the FFT unit.

Figure 9:
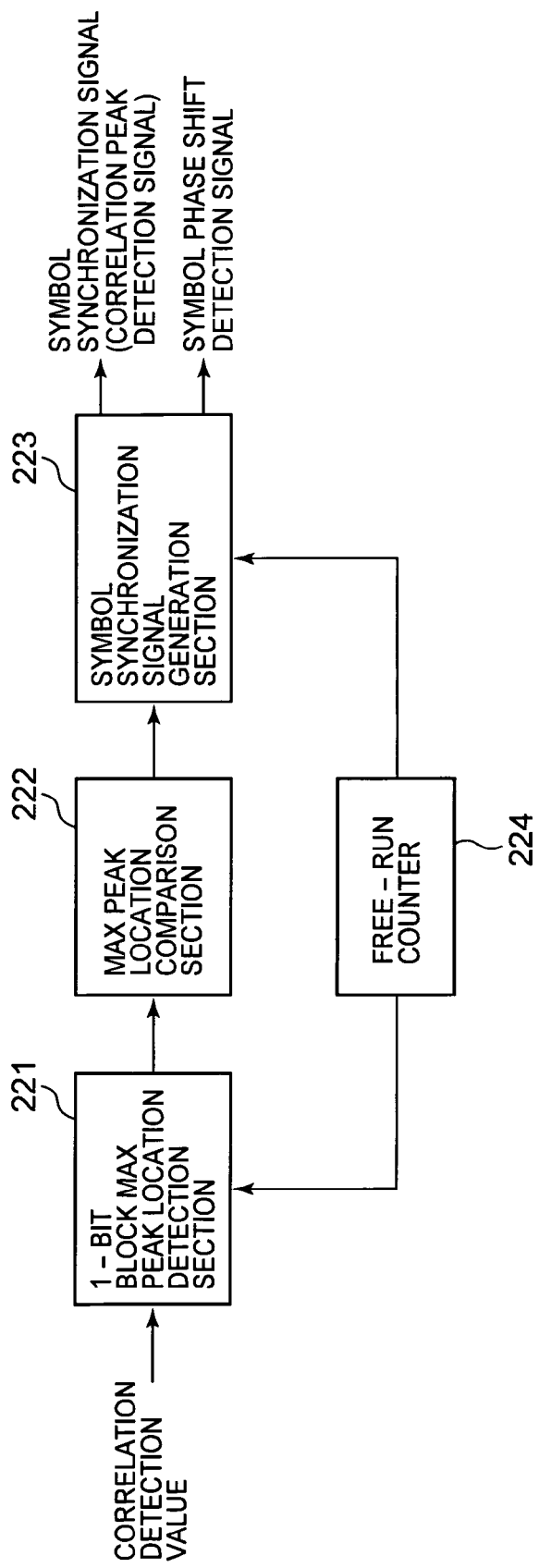
FIG. 9 is a block diagram illustrating a configuration of a correlation peak detection unit.

[Correlation Peak Detection Unit 22: FIG. 9]

Next, the correlation peak detection unit 22 will be described with reference to FIG. 9. FIG. 9 is a block diagram illustrating a configuration of the correlation peak detection unit 22.

As shown in FIG. 9, the correlation peak detection unit 22 includes a 1-bit block MAX peak location detection section 221 which inputs the correlation detection value from the matched filter unit 19 to detect a MAX peak location in a 1-bit block as a counter value; a MAX peak location comparison section 222 which compares the counter value of the detected MAX peak location to a counter value of the previous MAX peak location to output a comparison result; a symbol synchronization signal generation section 223 which outputs a symbol synchronization signal (correlation peak detection signal: synchronization detection signal) to the outside or a control unit 25 when a correlation peak is detected from the input comparison result, and outputs a symbol phase shift detection signal for symbol phase shift to the fine frequency shift detection unit 24; and a free-run counter 224 which outputs a free-run counter value.

The correlation peak detection unit 22 performs a correlation peak detection process on the correlation detection data from the matched filter unit 19 in the following sequence.

First, the free-run counter 224 is activated at the time of initiating the detection process The free-run counter 224 has 4,096=12 bits in a 256 kHz/1 bit length=512 chip/bit.

Second, the 1-bit block MAX peak location detection section 221 detects a MAX correlation value in every 1 bit block from the initiation of the detection process to perform storing a counter value at every update of the MAX correlation value to a memory.

Third, after the detecting of the MAX correlation value of a 2-bit block from the initiation of the detection process is completed, the MAX peak location comparison section 222 compares the counter values of the MAX correlation value in the 2-bit block and outputs a comparison result to the symbol synchronization signal generation section 223.

When the comparison result is shifted within a predetermined range (about ±3 to 4 counter), the symbol synchronization signal generation section 223 determines the comparison result as the correlation peak having high credibility and transmits the symbol synchronization signal (correlation peak detection signal).

Figure 10:
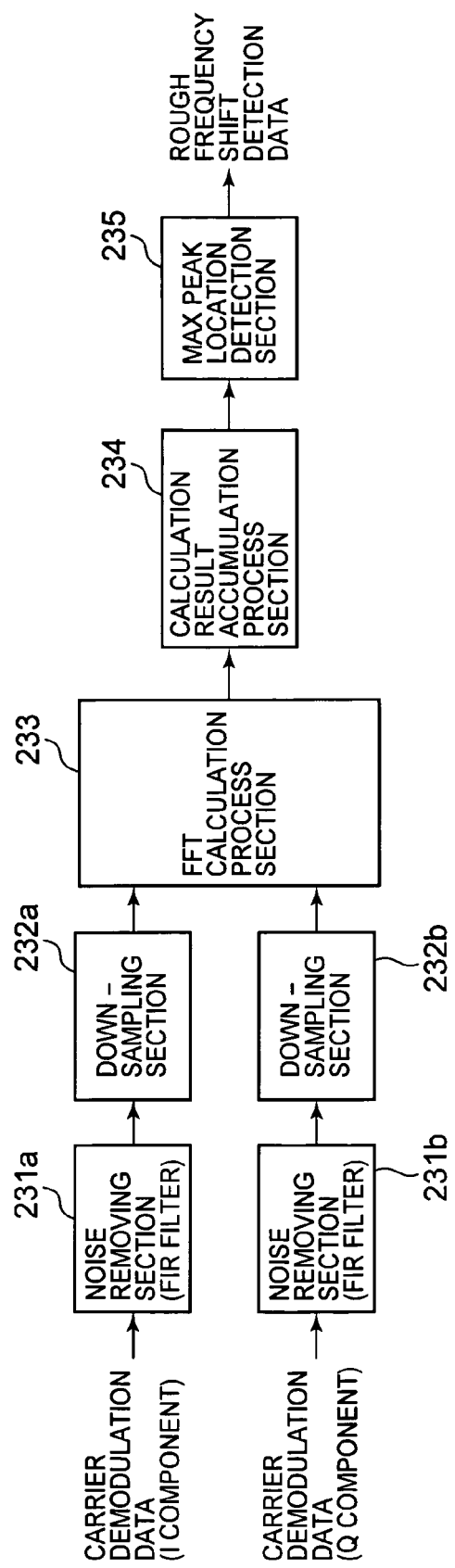
FIG. 10 is a block diagram illustrating a configuration of a rough frequency shift detection unit.

[Rough Frequency Shift Detection Unit 23: FIG. 10]

Next, the rough frequency shift detection unit 23 will be described with reference to FIG. 10. FIG. 10 is a block diagram illustrating a configuration of the rough frequency shift detection unit 23.

The rough frequency shift detection unit 23 removes a noise of the carrier demodulation data using LPF (Low Pass Filter), performs a down-sample process on the carrier demodulation data, performs an FFT calculation process on it to accumulate it, detects the MAX peak location, and outputs rough frequency shift detection data.

As shown in FIG. 10, the rough frequency shift detection unit 23 includes: a noise removing section 231a which inputs the carrier demodulation data of the I component and removes the noise using the FIR filter as the LPF; a noise removing section 231b which inputs the carrier demodulation data of the Q component and removes the noise using the FIR filter as the LPF; a down-sampling section 232a which performs the down-sampling process on the I component subjected to the noise removing process; a down-sampling section 232b which performs the down-sampling process on the Q component subjected to the noise removing process; an FFT calculation process section 233 which performs an FFT calculation process on the I and Q components subjected to the down-sampling process; a calculation result accumulation process section 234 which accumulates the FFT calculation result; and a MAX peak location detection section 235 which detects the MAX peak location from the accumulation process result.

The down-sampling sections 232a and 232b performs the down-sampling process at 32,768 Hz on the data subjected to the noise removing process.

Detecting a remaining frequency component of the data subjected to the noise removing process is performed in accordance with an amount of the IF carrier frequency shift between the base station and the portable equipment.

The detecting of the remaining frequency component is performed by the FFT calculation process of 32 points. Accordingly, detection frequency accuracy becomes 1,024 Hz.

In order to improve the detection accuracy, the signal processing device performs a peak detection process after accumulating the detection result several times.

A one-time calculation period is 32/32,768≈1 msec. The accumulation calculation can be performed up to 32 times.

When 32nd accumulation calculation is performed, the detection accuracy can be improved by about 15 dB.

The detected amount of rough frequency shift is supplied to the carrier data generation unit 16.

Figure 11:
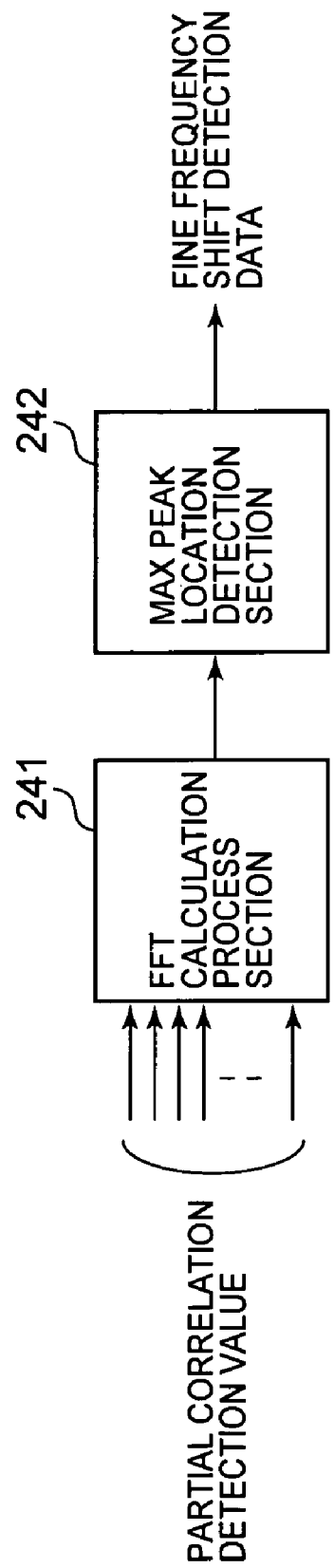
FIG. 11 is a block diagram illustrating a configuration of a fine frequency shift detection unit.

[Fine Frequency Shift Detection Unit 24: FIG. 11]

Next, the fine frequency shift detection unit 24 will be described with reference to FIG. 11. FIG. 11 is a block diagram illustrating a configuration of the fine frequency shift detection unit 24.

Before the reception data decoding section 18 performs the data decoding process, the fine frequency shift detection unit 24 performs the frequency detection process more accurately to further reduce an amount of frequency shift and reduce division loss (accuracy degrading caused by division) caused due to a division correlation process.

As shown in FIG. 11, the fine frequency shift detection unit 24 includes an FFT calculation process section 241 which inputs a partial correlation detection value and performs the FFT calculation process and a MAX peak location detection section 242 which detects a MAX peak location from the FFT calculation result and outputs fine frequency shift detection data.

The FFT calculation process section 241 also performs the FFT calculation process of 32 points similarly to the FFT calculation process section 233 of the rough frequency detection unit 23. In this case, 32-division correlation process data in detection of the correlation peak is input to perform the calculation process.

Even after the rough frequency shift is corrected, the remaining shift component of maximum ±512 Hz remains in the carrier demodulation data. Accordingly, the remaining shift component remains in the 32-division correlation process data in detection of the correlation peak.

For that reason, detecting the remaining shift component is performed by the FFT calculation process on the correlation data (32 division*I and Q components=64 points) in detection of the correlation peak.

The obtained fine frequency shift value is supplied to the carrier data generation unit 16.

Since the fine frequency shift detection unit 24 is the FFT calculation circuit of 32 points similarly to the rough frequency shift detection unit 23, sharing is possible.

[Course of Reception Process]

Hereinafter, an overall course of reception process will be described simply.

First, at initiation of the reception process, the carrier demodulation unit 15 performs the carrier demodulation process through the ADC control unit 11.

Second, the carrier demodulation process data is supplied to the rough frequency shift detection unit 23 and the matched filter unit 19, the rough frequency shift detection unit 23 performs detecting the amount of the rough frequency shift. Simultaneously, the matched filter unit 19 performs the correlation detection process and the correlation peak detection unit 22 performs the correlation peak detection process.

Third, when the rough frequency shift is detected, the carrier data generation unit 16 and the carrier demodulation unit 15 correct the amount of the rough frequency shift, and the correlation peak detection process is again performed.

Fourth, when the correlation peak detection unit 22 detects the correlation peak, each detection value (32 divisions, the sum of the I and Q components is 64 points) of division correlation corresponding to the peak value is supplied to the fine frequency shift detection unit 24, and the detecting of the amount of the fine frequency shift is performed.

Fifth, after the carrier data generation unit 16 and the carrier demodulation unit 15 again correct the IF carrier frequency from the detection result of the amount of the fine frequency shift, the reception data decoding unit 18 detects the synchronization word and again performs the reception data decoding process.

The foregoing description is the overall reception process in the signal processing device.

Figure 14:
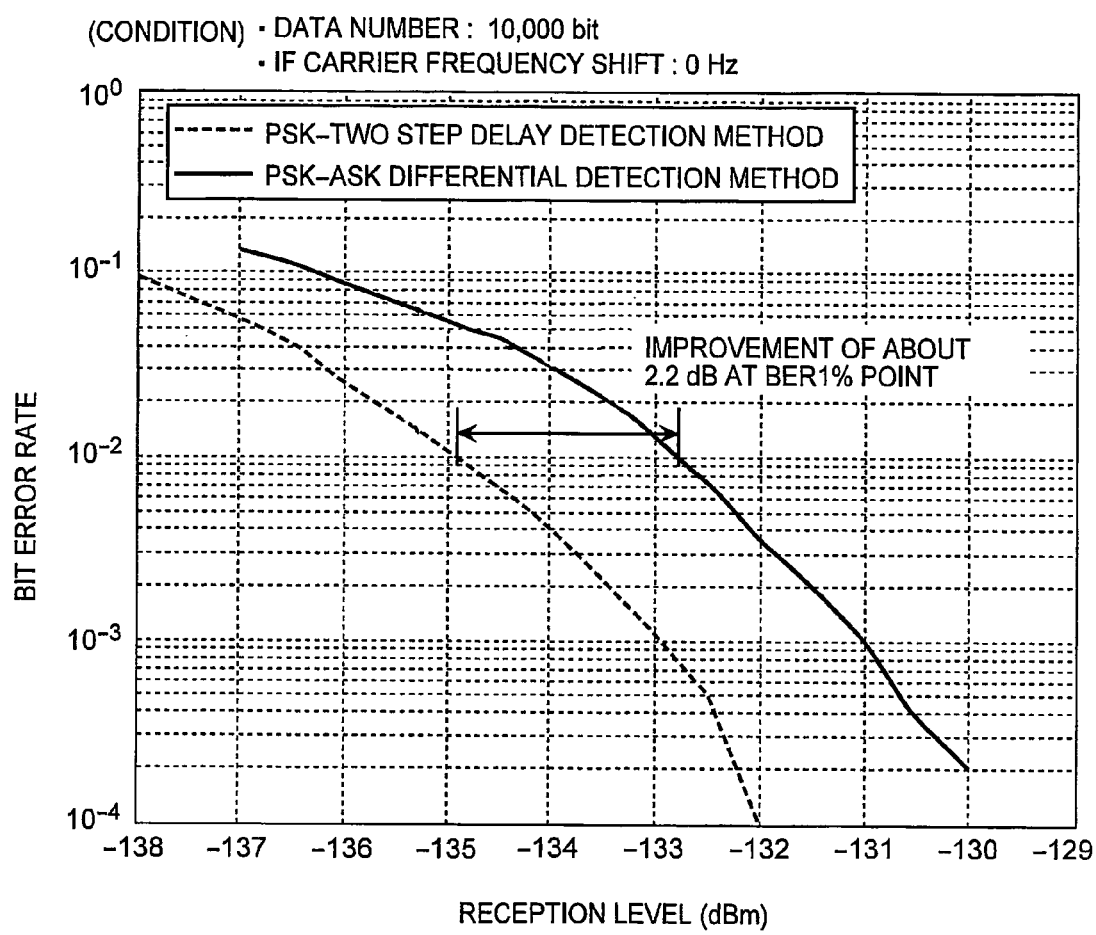
FIG. 14 is a diagram illustrating a normal BER property.

[Normal BER Property: FIG. 14]

A normal BER (Bit Error Rate) property will be described with reference to FIG. 14. FIG. 14 is a diagram illustrating the normal BER property.

As shown in FIG. 14, the detection accuracy is improved by about 2.2 dB at a BER1% point in the PSK-two step delay detection method according to the embodiment (PSK modulation and quadrature modulation method of CW having the 90° phase difference), compared to a PSK-ASK differential detection method (method of ASK (amplitude)-modulating a synchronization word/REF data spread modulation signal through IF carrier modulation process and performing a PSK modulation process as the IF carrier modulation process on the transmission data spread modulation signal to perform adding).

Figure 15:
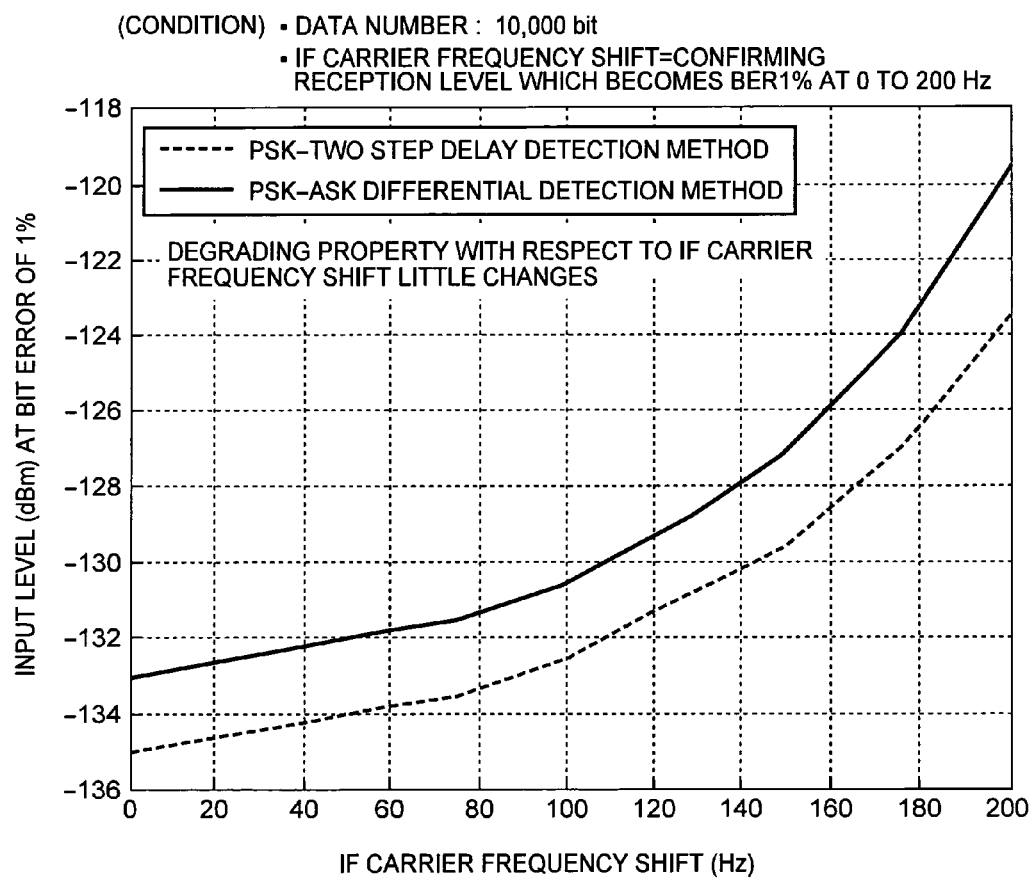
FIG. 15 is a diagram illustrating a BER property when an IF carrier frequency shift occurs.

[BER Property in IF Carrier Frequency Shift: FIG. 15]

A BER property in the IF carrier frequency shift will be described with reference to FIG. 15. FIG. 15 is a diagram illustrating a BER property when an IF carrier frequency shift occurs.

As shown in FIG. 15, a degrading property with respect to the IF carrier frequency shift in the BER1% property little changes.

Figure 16:
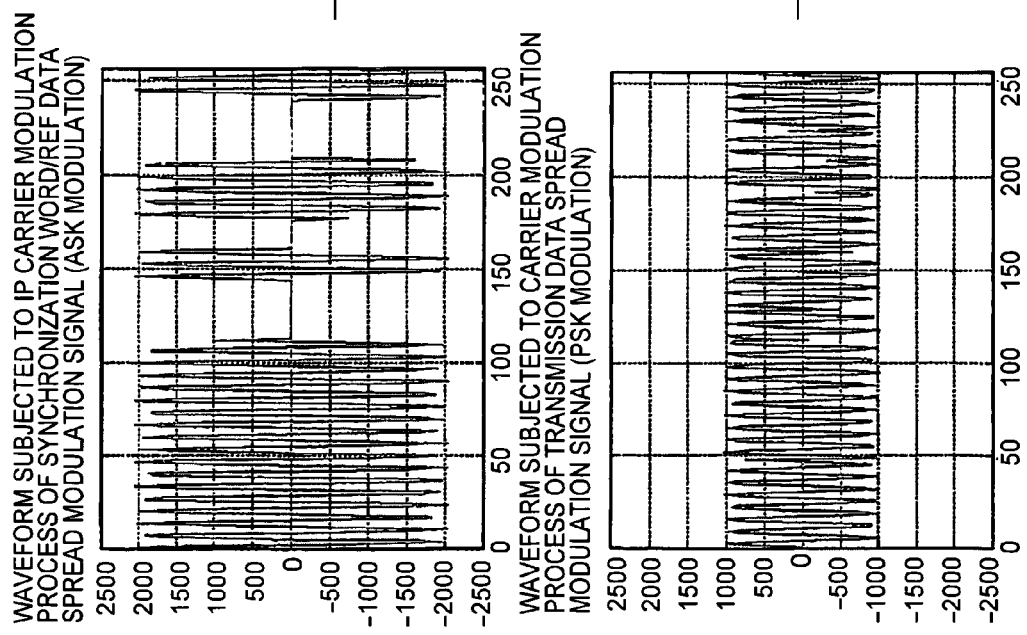
FIG. 16 is a diagram illustrating a waveform in the modulation process of a transmitting unit according to another example.

[Waveform in Modulation Process of Transmitting Unit According to PSK-ASK Differential Detection Method (Another Example): FIG. 16]

Next, a waveform in the modulation process of the transmitting unit according to a PSK-ASK differential detection method (another example) will be described with reference to FIG. 16. FIG. 16 is a diagram illustrating the waveform in the modulation process of the transmitting unit according to another example.

Figure 17:
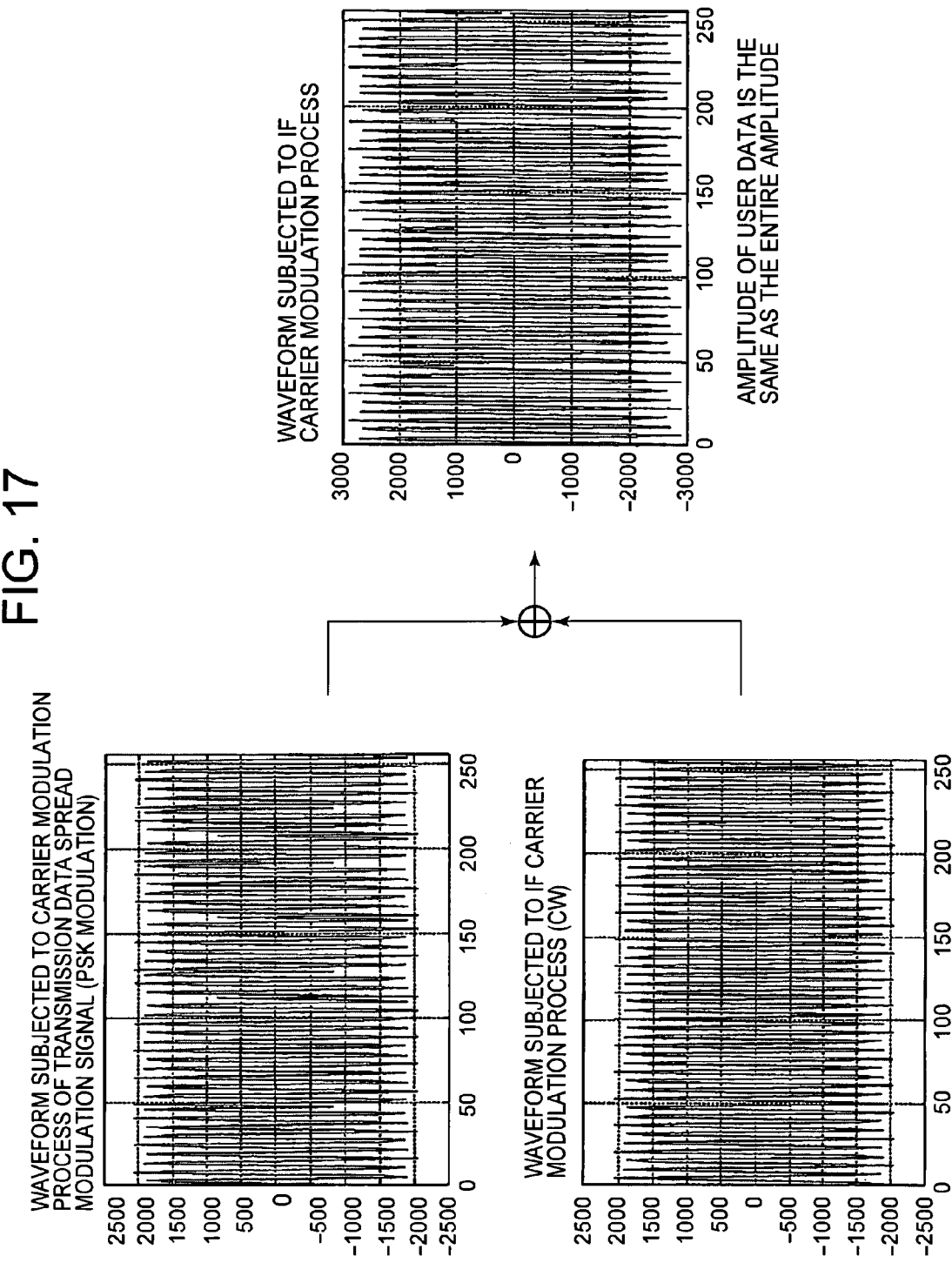
FIG. 17 is a diagram illustrating a waveform in the modulation process of the transmitting unit according to the embodiment.
Figure 18:
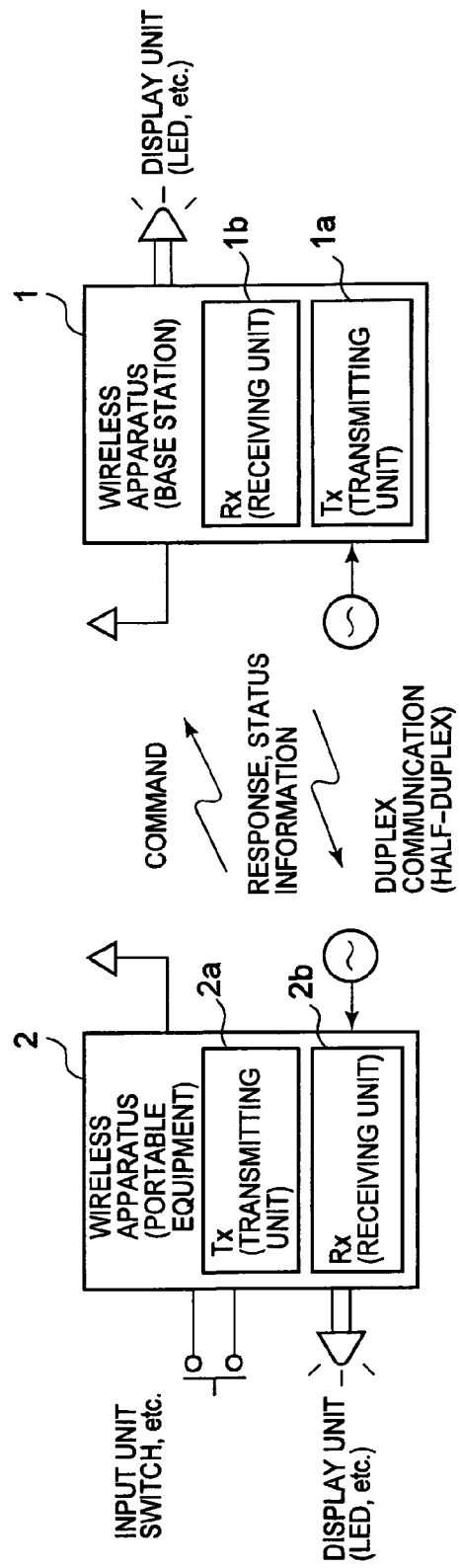
FIG. 18 is a schematic diagram illustrating a known duplex wireless system.
Figure 19:
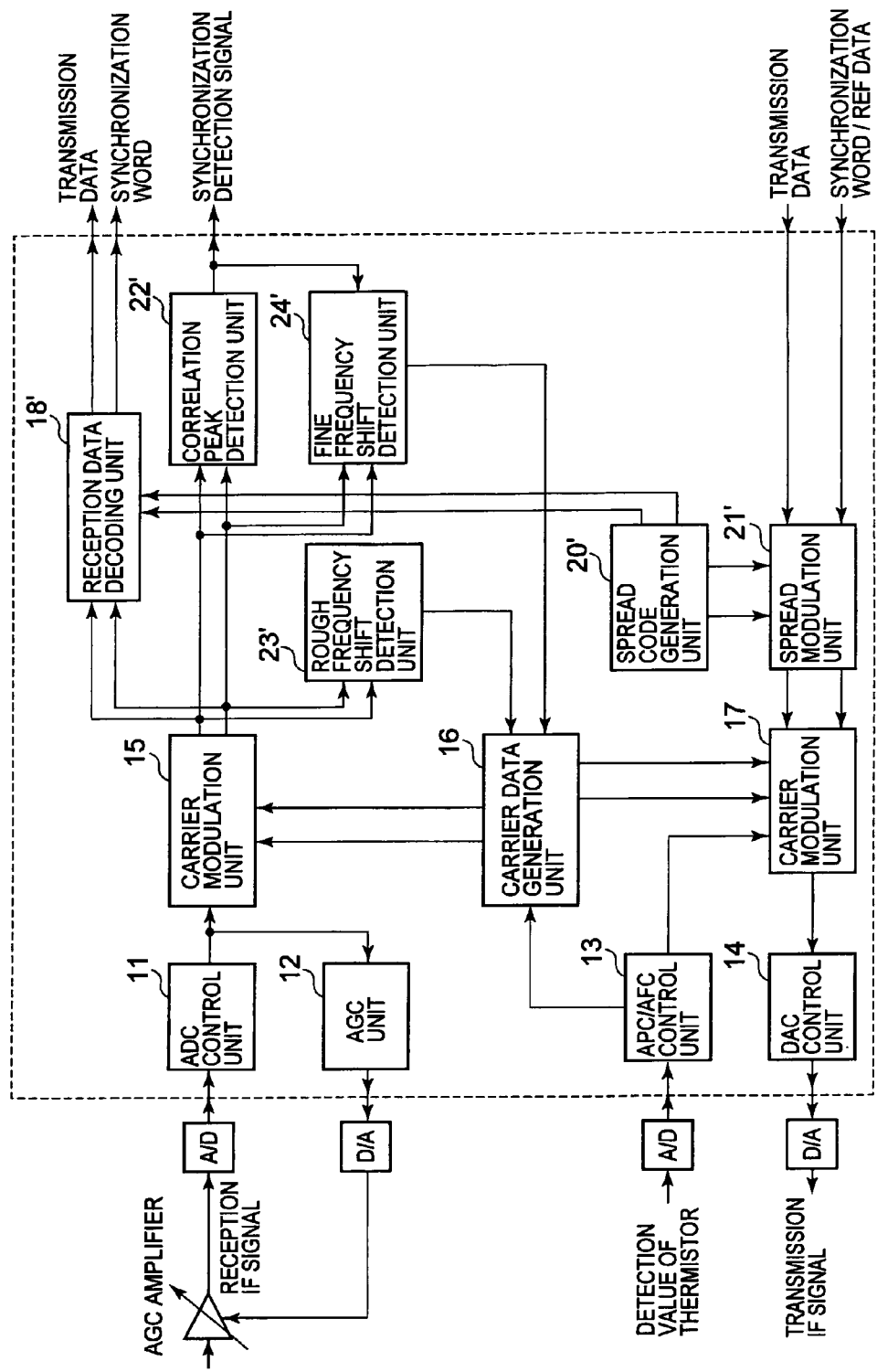
FIG. 19 is a block diagram illustrating a known signal processing device.

As shown in FIG. 16, a waveform in the IF carrier modulation (ASK modulation) of the synchronization word/REF data spread modulation signal and a waveform in the IF carrier modulation (PSK modulation) of the transmission data spread modulation signal are added in the carrier modulation unit 17 to generate an waveform subjected to the IF carrier modulation process shown in the right of FIG. 17. In this way, the carrier modulation unit 17 performs an appropriate IF carrier modulation process.

As shown in FIG. 16, as for the waveform subjected to the IF carrier modulation process, the amplitude of the user data is restrictive to ½ of the entire amplitude.

[Waveform in Modulation Process of Transmitting Unit According to Embodiment: FIG. 17]

Next, a waveform in the modulation process of the transmitting unit according to this embodiment (PSK-two step delay detection method) will be described with reference to FIG. 17. FIG. 17 is a diagram illustrating a waveform in the modulation process of the transmitting unit according to the embodiment.

As shown in FIG. 17, the waveform subjected to the IF carrier modulation process has been improved by nearly 3 dB, compared to the PSK-ASK differential detection method shown in FIG. 16. Accordingly, the amplitude of the user data is the same of the entire amplitude, thereby improving the property and improving the reception accuracy.

Advantage of Embodiment

In a signal processing device and a wireless apparatus, there are provided a signal processing device and the wireless apparatus includes: a spread modulation unit which includes a first differential encoding process section for performing a first differential encoding process on transmission data, a second differential encoding process section for performing a second differential encoding process on the output from the first differential encoding process section, and a spread modulation process section for performing a spread modulation process on the output from the second differential encoding process section and outputs a transmission data spread modulation signal; and a carrier modulation unit which quadrature-modulates the transmission data spread modulation signal and a continuous wave. Even when IF carrier frequency shift occurs, it is possible to obtain an advantage that polarity is not erroneously determined, the spread modulation process and the carrier modulation process are appropriately performed, reception accuracy is improved, and the circuit is miniaturized.

In The signal processing device and the wireless apparatus, there are provided: a first division accumulation process section which performs a first correlation process on reception data of the in-phase component; a second division accumulation process section which performs the first correlation process on reception data of the quadrature component; a first delay detection process section which performs a first delay detection process on the output from the first division accumulation process section; a second delay detection process section which performs the first delay detection process on the output from the second division accumulation process section; a third division accumulation process section which performs a second correlation process on the output from the first delay detection process section; a fourth division accumulation process section which performs the second correlation process on the output from the second delay detection process section; and a third delay detection process section which performs a second delay detection process on the outputs from the third and fourth division accumulation process sections. Even when IF carrier frequency shift occurs, it is possible to obtain an advantage that polarity is not erroneously determined, the spread modulation process, the carrier modulation process, and the reception data decoding process are appropriately performed, the reception accuracy is improved, and the circuit is miniaturized.

The invention is appropriate for the signal processing device and the wireless apparatus capable of not erroneously determining the polarity and appropriately performing the spread modulation process and the reception data decoding process, even when IF carrier frequency shift occurs.

What is claimed is:

1. A signal processing device of a wireless apparatus comprising:
 a spread code generation unit which outputs a receiving spread parallel code, a transmitting spread serial code and a receiving spread serial code;
 a carrier data generation unit which generates a carrier data;
 a carrier demodulation unit which removes an IF carrier component of a reception data on the basis of the carrier data and outputs a carrier demodulation data;
 a rough frequency shift detection unit which performs detecting an amount of a rough frequency shift of the carrier demodulation data and outputs the amount of the rough frequency shift to the carrier data generation unit;
 a matched filter which performs a despread process on the carrier demodulation data of the reception data by the receiving spread parallel code, performs a partial correlation calculation process, performs an entire adding process and outputs a partial correlation detection value and a correlation detection value;
 a correlation peak detection unit which inputs the correlation detection value and detects a correlation peak;
 a fine frequency shift detection unit which inputs the partial correlation detection value performs detecting an amount of a fine frequency shift based on the partial correlation detection value in detection of the correlation peak and outputs the amount of the fine frequency shift to the carrier data generation unit;
 a spread modulation unit which includes a first differential encoding process section for performing a first differential encoding process on transmission data, a second differential encoding process section for performing a second differential encoding process on the output from the first differential encoding process section, and a spread modulation process section for performing a spread modulation process on the output from the second differential encoding process section by the transmitting serial spread code and outputs a transmission data spread modulation signal;
 a carrier modulation unit which quadrature-modulates the transmission data spread modulation signal and a continuous wave; and
 a reception data decoding unit which inputs the carrier demodulation data, performs a correlation process by the receiving spread serial code and decodes the reception data;
 wherein the carrier data generation unit performs a frequency correction process on the carrier data in accordance with the amount of the rough frequency shift from the rough frequency shift detection unit and the amount of the fine frequency shift from the fine frequency shift detection unit and outputs a frequency corrected carrier data,
 the carrier demodulation unit outputs a frequency corrected carrier demodulation data based on the frequency corrected carrier data,
 the correlation peak detection unit detects the correlation peak based on the frequency corrected carrier demodulation data, the carrier modulation unit includes:

a first amplitude correction process section which performs an amplitude correction process on transmitting IF carrier data of an in-phase component in accordance with an amplitude control correction signal;

a second amplitude correction process section which performs the amplitude correction process on transmitting IF carrier data of a quadrature component in accordance with the amplitude control correction signal;

a carrier modulation process section which performs a carrier modulation process in accordance with data output from the second amplitude correction process section and the transmission data spread modulation signal, and outputs a carrier modulation process signal of the transmission data spread modulation signal; and an adder which adds the output from the first amplitude correction process section to the carrier modulation process signal of the transmission data spread modulation signal as a continuous wave which has a 90° phase difference with respect to the transmission data spread modulation signal.

2. The signal processing device according to claim 1, wherein the carrier modulation process in the carrier modulation process section is a PSK modulation process.

3. The signal processing device according to claim 1, further comprising a reception data decoding unit which includes:

a first division accumulation process section which performs a first correlation process on reception data of the in-phase component;

a second division accumulation process section which performs the first correlation process on reception data of the quadrature component;

a first delay detection process section which performs a first delay detection process on the output from the first division accumulation process section;

a second delay detection process section which performs the first delay detection process on the output from the second division accumulation process section;

a third division accumulation process section which performs a second correlation process on the output from the first delay detection process section;

a fourth division accumulation process section which performs the second correlation process on the output from the second delay detection process section; and a third delay detection process section which performs a second delay detection process on the outputs from the third and fourth division accumulation process sections.

4. The signal processing device according to claim 2, further comprising a reception data decoding unit which includes:

a first division accumulation process section which performs a first correlation process on reception data of the in-phase component;

a second division accumulation process section which performs the first correlation process on reception data of the quadrature component;

a first delay detection process section which performs a first delay detection process on the output from the first division accumulation process section;

a second delay detection process section which performs the first delay detection process on the output from the second division accumulation process section;

a third division accumulation process section which performs a second correlation process on the output from the first delay detection process section;

a fourth division accumulation process section which performs the second correlation process on the output from the second delay detection process section; and a third delay detection process section which performs a second delay detection process on the outputs from the third and fourth division accumulation process sections.

* * * * *